United States Patent
Hiroshige et al.

(10) Patent No.: US 8,641,523 B2
(45) Date of Patent: Feb. 4, 2014

(54) GAME APPARATUS, VIRTUAL CAMERA CONTROL METHOD, PROGRAM AND RECORDING MEDIUM

(75) Inventors: Nobuhisa Hiroshige, Tokyo (JP); Takashi Isono, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1528 days.

(21) Appl. No.: 12/029,657

(22) Filed: Feb. 12, 2008

(65) Prior Publication Data

US 2008/0207324 A1 Aug. 28, 2008

(30) Foreign Application Priority Data

Feb. 28, 2007 (JP) ................ P2007-050036

(51) Int. Cl.
 *A63F 13/00* (2006.01)
 *A63F 9/24* (2006.01)
(52) U.S. Cl.
 USPC ............ 463/33; 463/30; 463/31; 463/34
(58) Field of Classification Search
 USPC ..................... 463/30–34
 See application file for complete search history.

(56) References Cited

U.S. PATENT DOCUMENTS

| | | | |
|---|---|---|---|
| 6,361,436 B1 * | 3/2002 | Gouji et al. | ............ 463/7 |
| 6,409,597 B1 | 6/2002 | Mizumoto | |
| 6,413,163 B1 | 7/2002 | Yamauchi et al. | |
| 6,650,329 B1 | 11/2003 | Koike | |
| 2003/0171142 A1 * | 9/2003 | Kaji et al. | ............ 463/11 |
| 2004/0063501 A1 * | 4/2004 | Shimokawa et al. | ............ 463/49 |
| 2004/0176164 A1 | 9/2004 | Kobayashi | |
| 2006/0061567 A1 * | 3/2006 | Ouchi | ............ 345/419 |
| 2006/0246968 A1 | 11/2006 | Dyke-Wells | |
| 2007/0200855 A1 | 8/2007 | Minagawa | |

FOREIGN PATENT DOCUMENTS

| | | |
|---|---|---|
| EP | 0933105 A | 8/1999 |
| EP | 0990458 A | 4/2000 |
| EP | 1506802 A | 2/2005 |
| JP | 2004-329463 | 11/2004 |

OTHER PUBLICATIONS

English language Abstract of JP 2004-329463.
U.S. Appl. No. 12/029,802 to Hiroshige et al., which was filed Feb. 12, 2008.

* cited by examiner

*Primary Examiner* — Melba Bumgarner
*Assistant Examiner* — Marcus Jones
(74) *Attorney, Agent, or Firm* — Greenblum & Bernstein, P.L.C.

(57) ABSTRACT

When a new character is selected by a game player, the game apparatus changes the visual point and the visual axis corresponding to the newly selected character with preventing camera sickness.
When a character is changed, a visual point moves from point A to point B parallel to the line connecting a start point and a finish point with maintaining a direction of a visual axis. And then the visual point circular moves from point B to point C at a predetermined speed.

20 Claims, 7 Drawing Sheets

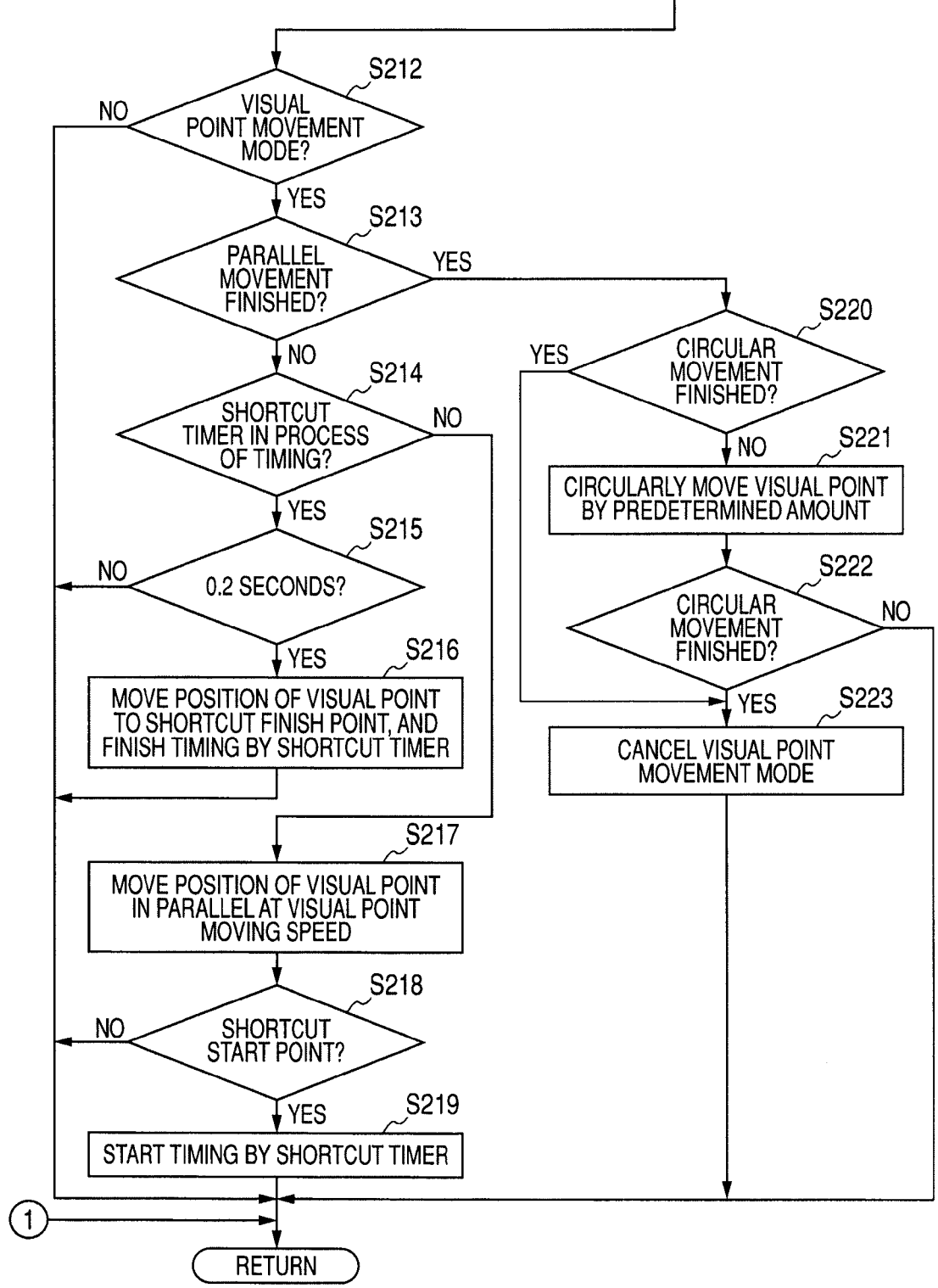

GAME APPARATUS, VIRTUAL CAMERA CONTROL METHOD, PROGRAM AND RECORDING MEDIUM

CROSS REFERENCE TO RELATED APPLICATION

The present disclosure relates to subject matter contained in Japanese Patent Application No. 2007-050036, filed on Feb. 28, 2007, the disclosure of which is expressly incorporated herein by reference in its entirety.

BACKGROUND OF THE INVENTION

1. Technical Field

The present invention relates to a technology for displaying a character specified in accordance with an operation of a player in a game in which a screen obtained by perspectively transforming, onto a virtual screen, a virtual three-dimensional space in which a plurality of characters exist, from a viewpoint of virtual camera, is displayed.

2. Related Art

In a three-dimensional video game, an object existing in a virtual three-dimensional space is perspectively transformed onto a virtual screen by a virtual camera, and a two-dimensional image generated by the perspective transformation is displayed on a display device. In order to increase a game reality, a control of a position of a visual point, and a direction of a visual axis, of the virtual camera becomes important. Herein, in the three-dimensional video game, it has been known that, in the event that a change in a point of gaze (a reference point) is marked when controlling the visual point of the virtual camera, a player suffers from a phenomenon of so-called camera sickness due to a marked change in an image being displayed on the display device.

In order not to allow a change in the position of the visual point, and the direction of the visual axis, of the virtual camera to become marked, so as to prevent the camera sickness, a game apparatus is proposed which, a position of a player character being made a target position, is configured in such a way as to slowly move the position of the visual point of the virtual camera by arranging in such a way that the point of gaze of the virtual camera approaches the target position at a predetermined rate (refer to, for example, Unexamined Japanese Patent Publication No. 2004-329463 (paragraphs 0054 to 0083 or the like)).

However, the game apparatus of Japanese Patent Publication No. 2004-329463 applies to a case in which the virtual camera is controlled following basically one player character. As opposed to this, among the three-dimensional video games, there is one in which a plurality of player characters appear, and a character to be operated is switched as needed by the operation of the player. In this way, in the event that the player character to be operated by the player has been switched, it is necessary to control the virtual camera in accordance with a new player character to be operated, but the control of the virtual camera during this time becomes problematic.

In the event that the player character to be operated has been switched, it is conceivable that a condition, in which the virtual camera is controlled in accordance with the previous player character to be operated, is instantaneously switched to a condition in which the virtual camera is controlled in accordance with a new player character to be operated. However, in this case, it is difficult to ascertain a positional relationship between the new and old characters to be operated from a screen being displayed, and a phenomenon, which cannot occur in the realistic world, occurs in which an infinite quantity of cameras exists no matter how large a quantity of characters may become. A visual effect cannot be obtained, either, in which a displayed image changes continuously.

Meanwhile, in a case of arranging in such a way as to control the virtual camera for a predetermined length of time in such a way that the displayed image changes continuously, depending on a condition in which the virtual camera is controlled during this time, a problem occurs in that the player feels a distortion in the image displayed on the display device, and suffers from the camera sickness, or the positional relationship between the characters to be operated before and after the switching becomes difficult to understand. Also, in the event that the virtual camera is too finely controlled, there is also a problem in that the process becomes too complicated.

SUMMARY OF THE INVENTION

The object of the present invention is to, when a new character is selected in a game in which a position of a visual point and a direction of a visual axis of a virtual camera are uniquely fixed in accordance with a character optionally selected by a player, change the position of the visual point and the direction of the visual axis so as to correspond to the newly selected character by a simple process, and at the same time to make a positional relationship between new and old characters selected in a process of changing the visual point and the direction of the visual axis easy for a player to understand, and thus to prevent camera sickness in the process of changing the visual point and the direction of the visual axis.

In order to achieve the object, according to a first aspect of the present invention, there is provided a game apparatus which displays, on a display device, a game screen obtained by perspectively transforming, onto a virtual screen, a virtual three-dimensional space in which a plurality of characters exist from a viewpoint of a virtual camera. The game apparatus includes a character specifying system that specifies a character optionally selected from among the plurality of characters in accordance with an operation of a player. The game apparatus further includes a virtual camera controller that controls a direction of a visual axis in such a way that the direction of the visual axis becomes a direction having a predetermined relationship to a direction in which the character specified by the character specifying system faces with the specified character as a reference point and controls a position of a visual point in such a way that a distance between the specified character and the visual point becomes a predetermined distance. The game apparatus further includes a perspective transformer that perspectively transforms the virtual three-dimensional space from the virtual camera, in which the position of the visual point and the direction of the visual axis have been fixed by the virtual camera controller, onto the virtual screen, and generates two-dimensional images to be displayed on a screen of the display device. The game apparatus further includes a display controller that displays the two-dimensional images generated by the perspective transformer on the display device.

In the game apparatus, the virtual camera controller includes a parallel movement system that, when a new character is specified by the character specifying system, moves the position of the visual point in a straight line, parallel to a straight line connecting the position of the previously specified character and the position of the newly specified character, so that the newly specified character becomes the reference point, while maintaining the direction of the visual axis in a direction having a predetermined relationship to a direction of the previously specified character. The virtual camera controller further includes a circular movement system that, after the position of the visual point is moved by the parallel movement system to a position in which the newly specified character becomes the reference point, circularly moves the position of the visual point so that the direction of the visual axis becomes a direction having a predetermined relationship to a direction in which the newly specified character faces, while maintaining the newly specified character as the reference point.

According to a second aspect of the invention, there is provided a game apparatus which displays, on a display device, a game screen obtained by perspectively transforming, onto a virtual screen, a virtual three-dimensional space in which a plurality of characters exist from a viewpoint of a virtual camera. The game apparatus includes a character specifying system that specifies a character optionally selected from among the plurality of characters in accordance with an operation of a player. The game apparatus further includes a virtual camera controller that controls a direction of a visual axis in such a way that the direction of the visual axis becomes a direction having a predetermined relationship to a direction in which the character specified by the character specifying system faces with the specified character as a reference point and controls a position of a visual point in such a way that a distance between the specified character and the visual point becomes a predetermined distance. The game apparatus further includes a perspective transformer that perspectively transforms the virtual three-dimensional space from the virtual camera, in which the position of the visual point and the direction of the visual axis have been fixed by the virtual camera controller, onto the virtual screen, and generates two-dimensional images to be displayed on the display device. The game apparatus further includes a display controller that displays the two-dimensional images generated by the perspective transformer on the display device.

In the game apparatus, the virtual camera controller includes a circular movement system that, when a new character is specified by the character specifying system, circularly moves the position of the visual point so that the direction of the visual axis becomes a direction having a predetermined relationship to a direction in which the newly specified character faces, while maintaining the previously specified character as the reference point. The virtual camera controller further includes a parallel movement system that, after the position of the visual point is moved by the circular movement system so that the direction of the visual axis becomes a direction having a predetermined relationship to a direction in which the newly specified character faces, moves the position of the visual point in a straight line, parallel to a straight line connecting the position of the previously specified character and the position of the newly specified character, so that the newly specified character becomes the reference point, while maintaining the direction of the visual axis.

In the game apparatus according to the first aspect, when the new character is specified by the operation of the player, the visual point moves so that the newly specified character becomes the reference point on the straight line parallel to the straight line connecting the previously specified character and the newly specified character, while maintaining the direction of the visual axis, and then the visual point circularly moves so that the direction of the visual axis becomes a predetermined direction with respect to the direction in which the newly specified character faces, while maintaining the newly specified character as the reference point.

In the game apparatus according to the second aspect, when the new character is specified by the operation of the player, the visual point circularly moves so that the direction of the visual axis becomes the direction having the predetermined relationship to the direction in which the newly specified character faces, while maintaining the previously specified character as the reference point, and then the visual point moves on the straight line parallel to the straight line connecting the previously specified character and the newly specified character so that the newly specified character becomes the reference point, while maintaining the direction of the visual axis.

Herein, as the direction of the visual axis is constant while the parallel movement of the visual point is being carried out, the image displayed on the display device also only changes in parallel while the parallel movement of the visual point is being carried out. For this reason, it does not happen that a distortion occurs in the image displayed on the display device. Meanwhile, as the visual point maintains the reference point as the newly specified character while the circular movement (a rotational movement) of the visual point is being carried out, the player can ascertain a character, which has high visibility in the game, in a center of the image displayed on the display device, and is not much annoyed by a change in a surrounding image.

By this means, it is possible to prevent the player from suffering from camera sickness in a process which changes the positions of the visual point and visual axis of the virtual camera in accordance with the newly specified character. Also, as only the parallel movement and the circular movement are applied as a method for controlling the visual point and visual axis of the virtual camera in accordance with the newly specified character, it is possible for the controls of the visual point and visual axis to be realized by relatively simple controls.

Also, as the visual point of the virtual camera moves parallel to the straight line connecting the previously specified character and the newly specified character in a condition in which the direction of the visual axis is maintained, it becomes easy for the player to ascertain the positional relationship between the previously specified character and the newly specified character from the image displayed on the display device too. Also, as the circular movement of the visual point is carried out with the character as the reference point, the player can ascertain how much the visual point has moved circularly due to a change in a direction of the character in the displayed image.

In the game apparatus according to the first and second aspect, it is possible to arrange in such away that the parallel movement system, regardless of the distance between the previously specified character and the newly specified character, moves the position of the visual point within a predetermined time from a position in which the previously specified character is the reference point to the position in which the newly specified character is the reference point.

In this case, when the new character is specified by the operation of the player, as the parallel movement of the visual point is carried out within the predetermined time regardless of the distance between the previously specified character and the newly specified character, it does not happen that a time for the parallel movement becomes too long. A time for which the parallel movement of the visual point is carried out is a time for which the player cannot operate any character, and a time for which the player is merely watching the two-dimensional images. In the event that the time for which the player is merely watching the two-dimensional images is long, there is a fear of reducing the interest of the player in the game. By setting a limitation on the time for which the parallel movement of the visual point is carried out, it is possible to arrange in such away as not to reduce the interest of the player in the game.

In the game apparatus according to the first and second aspects, it is possible to arrange in such a way that the parallel movement system moves the position of the visual point below a predetermined speed from the position in which the previously specified character is the reference point to the position in which the newly specified character is the reference point.

In this case, the speed at which the parallel movement of the visual point being equal to or lower than the predetermined speed, as it does not happen that a change in contents displayed in the two-dimensional images becomes too large, it is possible to further prevent the camera sickness.

Herein, it is also acceptable that the parallel movement system includes a movement time determination system that, when the position of the visual point has been moved below the predetermined speed, determines whether the parallel movement system can move the position of the visual point within the predetermined time from the position in which the previously specified character is the reference point to the position in which the newly specified character is the reference character. When the movement time determination system has determined that the parallel movement system cannot move the position of the visual point within the predetermined time, the parallel movement system moves the position of the visual point without limiting a speed of the movement to the predetermined speed or less in a partial intermediate section of the straight line parallel to the straight line connecting the previously specified character and the newly specified character.

In this case, in the event that the position of the visual point cannot be moved within the predetermined time below the predetermined speed, the moving speed of the visual point is not limited only in the partial intermediate section of the straight line parallel to the straight line connecting the previously specified character and the newly specified character. For this reason, even in the event that the distance between the previously specified character and the newly specified character is long, it is possible to suppress the time required for the visual point to move in parallel to the predetermined time. Also, as it is the partial intermediate section in which the limitation is removed from the moving speed of the visual point, it not happening that the change in the displayed image becomes too large immediately after a movement of the visual point which gives a particularly strong visual impression to the player starts, or immediately before it finishes, it is possible to suppress the camera sickness as far as is possible.

Also, it is also possible to arrange in such a way that the movement time determination system, depending on whether the distance between the previously specified character and the newly specified character is within a certain limit, determines whether the parallel movement system can move the position of the visual point below the predetermined speed and within the predetermined time.

In this case, it being possible to determine whether or not the visual point can be moved in parallel within the predetermined time below the predetermined speed, by a relatively simple method which determines whether or not the distance between the previously specified character and the newly specified character is within the predetermined distance, the process is not complicated.

In the game apparatus according to the first and second aspects, it is possible to arrange in such a way that the circular movement system circularly moves the position of the visual point below the predetermined speed until the direction of the visual axis becomes the direction having the predetermined relationship to the direction in which the newly specified character faces.

In this case, as an arrangement is such that the circular movement of the visual point is carried out below the predetermined speed, it neither happening that the speed at which the circular movement of the visual point becomes too high, nor that the change in the image during the circular movement becomes too large, it is possible to further prevent the camera sickness.

In the game apparatus according to the first and second aspects, it is also acceptable that the circular movement system includes a rotation angle determination system that determines, in both of left and right rotation directions, a size of a rotation angle of the position of the visual point from the direction of the visual axis being the direction having the predetermined relationship to the direction in which the previously specified character faces, to the direction having the predetermined relationship to the direction in which the newly specified character faces. The circular movement system circularly moves the position of the visual point in a rotation direction in which the rotation angle determination system determines the rotation angle to be smaller.

In this case, as an arrangement is such that the circular movement of the visual point is carried out in the direction in which the rotation angle becomes small, it is possible to shorten the time for which the circular movement is carried out. Also, as it is sufficient that the rotation angle through which the visual point is circularly moved is as small as possible, it is easy to ascertain how much the visual point has been circularly moved.

In the game apparatus according to the first and second aspects, the game apparatus may further include a card disposition system that dispose a plurality of cards corresponding to the plurality of characters on a plane corresponding to a virtual two-dimensional plane perpendicular to a height direction of the virtual three-dimensional space. In this apparatus, the character specifying system specifies a character corresponding to a card selected by the operation of the player from among the plurality of cards disposed on the card disposition system as a character selected by the player.

In this case, the player can select a desired character him or herself by an intuitive operation of selecting a card corresponding to the desired character from among the plurality of characters disposed on the card disposition system, resulting in an improvement in operability. Also, the player, through positions of the cards disposed on the card disposition system, can ascertain a position of each corresponding character.

Herein, the game apparatus may further include a card detector that detects a position and direction of each card disposed on the card disposition system. The game apparatus may further include a character controller that, in accordance with the position and direction of each card detected by the card detector, controls a position and direction of a character corresponding to each card.

In this case, by changing a position and direction of a card disposed on the card disposition system, the player can change a position and direction of a character corresponding to the card in the virtual three-dimensional space.

Also, it is also possible to arrange in such a way that the card disposition system is configured of a card mounting base on which is placed a tangible card is placed, information which can identify a type of the corresponding character being recorded on the tangible card. The character specifying system may includes a card specifying system which specifies a card, from among the cards placed on the card mounting base, which is being touched by the player. The character specifying system specifies a character corresponding to a card last specified by the card specifying system as the character selected by the player.

In this case, the player, without carrying out a complicated operation, can dispose a card corresponding to the character in a desired position. Also, the more kinds of card the player owns, the more options of specifiable characters increase. By this means, there occurs not only pleasure in merely playing a game, but also enjoyment in collecting cards to be used in the game.

Also, it is also possible to arrange in such a way that the card disposition system is configured of a virtual card display system that displays a virtual card prepared for each of the plurality of characters on a second display device which is provided separately from the display device and has a touch panel disposed on a front surface. The character specifying system specifies a character corresponding to a card corresponding to a position of the touch panel which has last been touched from among the virtual cards displayed on the second display device as the character selected by the player.

In this case, the player can enjoy the game without preparing any card corresponding to the character.

In order to achieve the heretofore described object, according to a third aspect of the invention, there is provided a virtual camera control method in a game in which a game screen obtained by perspectively transforming, onto a virtual screen, a virtual three-dimensional space in which a plurality of characters exist from a viewpoint of a virtual camera is displayed on a display device. The method includes specifying a character selected from among the plurality of characters by an operation of an input device by a player. The method further includes, when a new character differing from the previously specified character is specified from among the plurality of characters, moving a position of a visual point parallel to a straight line parallel to a straight line connecting the position of the previously specified character and the position of the newly specified character, while maintaining a direction of a visual axis in a direction having a predetermined relationship to a direction of the previously specified character. The method further includes, after the position of the visual point moves in parallel to a position in which the newly specified character becomes a reference point, circularly moving the position of the visual point so that the direction of the visual axis becomes a direction having a predetermined relationship to a direction in which the newly specified character faces, while maintaining the newly specified character as the reference point. The method further includes perspectively transforming the virtual three-dimensional space from the virtual camera onto the virtual screen at predetermined time intervals, and generating two-dimensional images to be displayed on the display device. The method further includes displaying the two-dimensional images generated by the perspective transformation sequentially on a screen of the display device.

In order to achieve the heretofore described object, according to a fourth aspect of the invention, there is provided a virtual camera control method in a game in which a game screen obtained by perspectively transforming, onto a virtual screen, a virtual three-dimensional space in which a plurality of characters exist from a viewpoint of a virtual camera is displayed on a display device. The method includes specifying a character selected from among the plurality of characters by an operation of an input device by a player. The method further includes, when a new character differing from the previously specified character is specified from among the plurality of characters, circularly moving a position of a visual point so that a direction of a visual axis becomes a direction having a predetermined relationship to a direction in which the newly specified character faces, while maintaining the previously specified character as a reference point. The method further includes, after the position of the visual point moves circularly so that the direction of the visual axis becomes the direction having the predetermined relationship to the direction in which the newly specified character faces, moving the position of the visual point parallel to a straight line parallel to a straight line connecting the position of the previously specified character and the position of the newly specified character so that the newly specified character becomes the reference point, while maintaining the direction of the visual axis. The method further includes perspectively transforming the virtual three-dimensional space from the virtual camera onto the virtual screen at predetermined time intervals, and generating two-dimensional images to be displayed on the display device. The method further includes displaying the two-dimensional images generated by the perspective transformation sequentially on the screen of the display device.

In order to achieve the heretofore described object, according to a fifth aspect of the invention, there is provided a program for causing a computer apparatus to execute a game in which a game screen obtained by perspectively transforming, onto a virtual screen, a virtual three-dimensional space in which a plurality of characters exist from a viewpoint of a virtual camera is displayed on a display device. The program causes the computer apparatus to function as a character specifying system that specifies a character optionally selected from among the plurality of characters in accordance with an operation of a player. The program further causes the computer apparatus to function as a virtual camera controller that controls a direction of a visual axis in such a way that the direction of the visual axis becomes a direction having a predetermined relationship to a direction in which the character specified by the character specifying system faces with the specified character as a reference point and controls a position of a visual point in such a way that a distance between the specified character and the visual point becomes a predetermined distance. The program further causes the computer apparatus to function as a perspective transformer that perspectively transforms the virtual three-dimensional space from the virtual camera, in which the position of the visual point and the direction of the visual axis have been fixed by the virtual camera controller, onto the virtual screen, and generates two-dimensional images to be displayed on a screen of the display device. The program further causes the computer apparatus to function as a display controller that displays the two-dimensional images generated by the perspective transformer on the display device. In the program, the virtual camera controller includes a parallel movement system that, when a new character is specified by the character specifying system, moves the position of the visual point in a straight line, parallel to a straight line connecting the position of the previously specified character and the position of the newly specified character, so that the newly specified character becomes the reference point, while maintaining the direction of the visual axis in a direction having a predetermined relationship to a direction of the previously specified character. The virtual camera controller further includes a circular movement system that, after the position of the visual point is moved by the parallel movement system to a position in which the newly specified character becomes the reference point, circularly moves the position of the visual point so that the direction of the visual axis becomes a direction having a predetermined relationship to a direction in which the newly specified character faces, while maintaining the newly specified character as the reference point.

In order to achieve the heretofore described object, according to a sixth aspect of the invention, there is provided a program for causing a computer apparatus to execute a game in which a game screen obtained by perspectively transforming, onto a virtual screen, a virtual three-dimensional space in which a plurality of characters exist from a viewpoint of a virtual camera is displayed on a display device. The program causes the computer apparatus to function as a character specifying system that specifies a character optionally selected from among the plurality of characters in accordance with an operation of a player. The program further causes the computer apparatus to function as a virtual camera controller that controls a direction of a visual axis in such a way that the direction of the visual axis becomes a direction having a predetermined relationship to a direction in which the character specified by the character specifying system faces with the specified character as a reference point and controls a position of a visual point in such a way that a distance between the specified character and the visual point becomes a predetermined distance. The program further causes the computer apparatus to function as a perspective transformer that perspectively transforms the virtual three-dimensional space from the virtual camera, in which the position of the visual point and the direction of the visual axis have been fixed by the virtual camera controller, onto the virtual screen, and generates two-dimensional images to be displayed on the display device. The program further causes the computer apparatus to function as a display controller that displays the two-dimensional images generated by the perspective transformer on the display device. In the program, the virtual camera controller includes a circular movement system that, when a new character is specified by the character specifying system, circularly moves the position of the visual point so that the direction of the visual axis becomes a direction having a predetermined relationship to a direction in which the newly specified character faces, while maintaining the previously specified character as the reference point. The virtual camera controller further includes a parallel movement system that, after the position of the visual point is moved by the circular movement system so that the direction of the visual axis becomes a direction having a predetermined relationship to a direction in which the newly specified character faces, moves the position of the visual point in a straight line, parallel to a straight line connecting the position of the previously specified character and the position of the newly specified character, so that the newly specified character becomes the reference point, while maintaining the direction of the visual axis.

The program according to the fifth and sixth aspect can be provided recorded on a computer readable recording medium. It is also acceptable that the computer readable recording medium is a recording medium which is configured in such a way as to be attachable to and removable from the computer apparatus, and is provided separately from the computer apparatus. It is also acceptable that the computer readable recording medium is a recording medium, such as a fixed disk drive, which is installed inside the computer apparatus, and is provided together with the computer apparatus. The program according to the third aspect can also be distributed from a server existing on a network, with a data signal therefrom superimposed on a carrier, to the computer apparatus through the network.

DESCRIPTION OF THE PREFERRED
EMBODIMENT(S)

Hereafter, a description will be given of an embodiment of the invention, with reference to the accompanying drawings.

A game applied to the embodiment being a card game carried out using cards (a character card and an IC card), a player who participates in the game needs to have the cards. A player who does not have the cards can obtain the cards by purchasing a starter set including therein one or more character cards (trading cards) and one IC card (a memory card). The character card is one which the player uses for causing a character to participate in the game. The IC card is a recording medium on which is recorded a history of the game played by the player.

Figure 1:
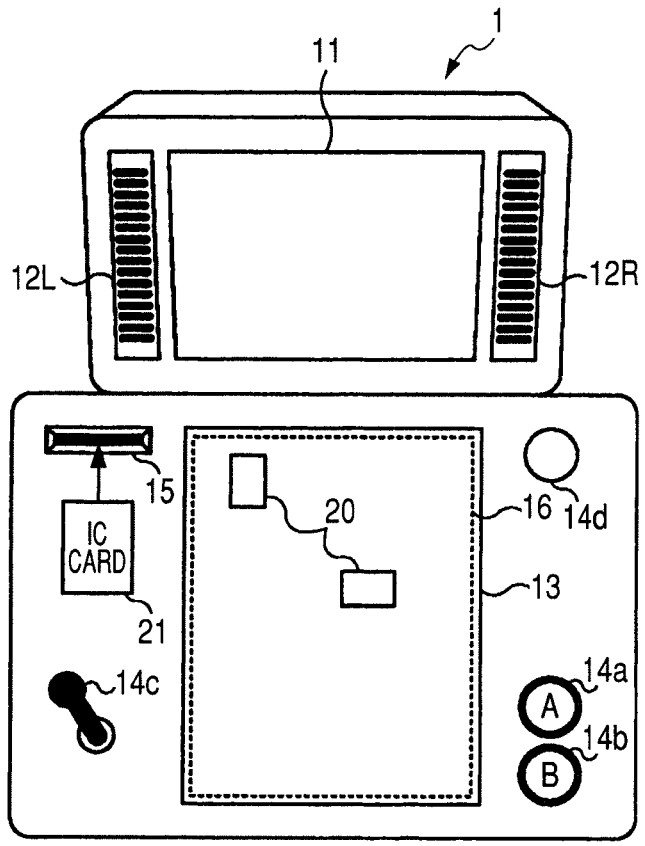
FIG. 1 is a view showing an external configuration of a card game apparatus according to an embodiment of the invention.

FIG. 1 is an external view showing an outline configuration of an arcade type card game apparatus applied to the embodiment. Herein, an arcade type game apparatus is shown as one example of a card game apparatus 1. In FIG. 1, a liquid crystal display (hereafter referred to as an LCD) 11 and sound outlet apertures of speakers 12L and 12R are formed on a front surface of the card game apparatus 1. The LCD 11 mounted on a center of the front surface of the card game apparatus 1 displays an image corresponding to an implementation of the game. The speakers 12L and 12R mounted on a left and a right, sandwiching the LCD 11, output a sound corresponding to the implementation of the game.

A card disposition panel 13, operating switches 14, and an IC card slot 15 are formed on a base (a top surface of the base) of the card game apparatus 1. Character cards 20 corresponding to characters, which the player causes to participate in the game, are placed on the card disposition panel 13 mounted in a center of the base of the card game apparatus 1. The card disposition panel 13 is a plane corresponding to a virtual two-dimensional plane perpendicular to a height direction of a virtual three-dimensional space (to be described hereafter). Character illustrations are printed on faces of the character cards 20, and data patterns (identification codes) for identifying the characters printed on the faces are recorded on backs thereof. Up, down, left and right directions are fixed for the character cards 20 in accordance with the illustrations printed on the faces, and data for identifying the directions of the character cards 20 are also recorded on the backs.

A transparent glass plate on which is mounted a thin play field sheet is attached to a top surface of the card disposition panel 13. The character cards 20 are placed on a top surface of the play field sheet, but will hereafter be described, for ease of explanation, as being placed on the card disposition panel 13. A pressure-sensitive touch panel 16 (an area delineated by a broken line in FIG. 1) is mounted on the top surface of the card disposition panel 13.

A light source, which irradiates an infrared ray (invisible light) onto the backs of the character cards 20 placed on the card disposition panel 13, an image sensor 108 (to be described hereafter, FIG. 2), which images the card data patterns recorded on the backs of the character cards 20 placed on the card disposition panel 13, a reflecting plate, which leads light reflected off the character cards 20 placed on the card disposition panel 13 to the image sensor, and a filter, which removes ambient light (visible light) included in the light reflected off the reflecting plate, are attached to an interior of the card disposition panel 13 (an interior of the base) of the card game apparatus 1. The light source is configured of a light emitting diode (LED) which emits invisible light, such as the infrared ray or an ultraviolet ray, invisible to the naked eye. In a case in which visible light is emitted from the light source, the filter removing the visible light is also attached to the interior of the card disposition panel 13 (the interior of the base) of the card game apparatus 1.

The operating switches 14 mounted on the left and right sandwiching the card disposition panel 13 include an operation switch (hereafter referred to as an "A button") 14a, an operation switch (hereafter referred to as a "B button") 14b, a joystick 14c, and a start switch 14d. The A button 14a and the B button 14b, mounted on a front to a right side of the card disposition panel 13, are used to input predetermined instructions such as, for example, an instruction for behavior of the player characters which the player can operate using the operating switches 14. The joystick 14c, mounted on a front to a left side of the card disposition panel 13, is used to input a direction on a game screen, such as instructing a movement direction of a cursor. The start switch 14d, mounted on a back to the right side of the card disposition panel 13, is used for inputting an instruction to start the game.

The IC card slot 15, mounted on a back to the left side of the card disposition panel 13, is one into which the player inserts the IC card 21. An IC card reader/writer which is to be electrically connected to the IC card 21 is built into an interior of the IC card slot 15. The player, before starting the game, inserts the IC card 21 into the IC card slot 15, and causes the IC card reader/writer 107 (to be described hereafter, refer to FIG. 2), provided inside the IC card slot 15, to read each item of data stored in the IC card 21. At least a character's skill and a past game result, corresponding to a kind and card data of a character card 20 owned by the player, are stored in the IC card 21.

A coin slot (not shown) and a card payout opening (not shown) are formed on a side surface (a side surface of the base) of the card game apparatus 1. The coin slot is one from which the player inserts a coin. The card payout opening is one from which the character card 20 is paid out after a finish of the game. The player, by inserting the IC card 21 into the IC card slot 15, inserting a coin for carrying out the game into the coin slot, and operating the start switch 14d, can start the game.

Figure 2:
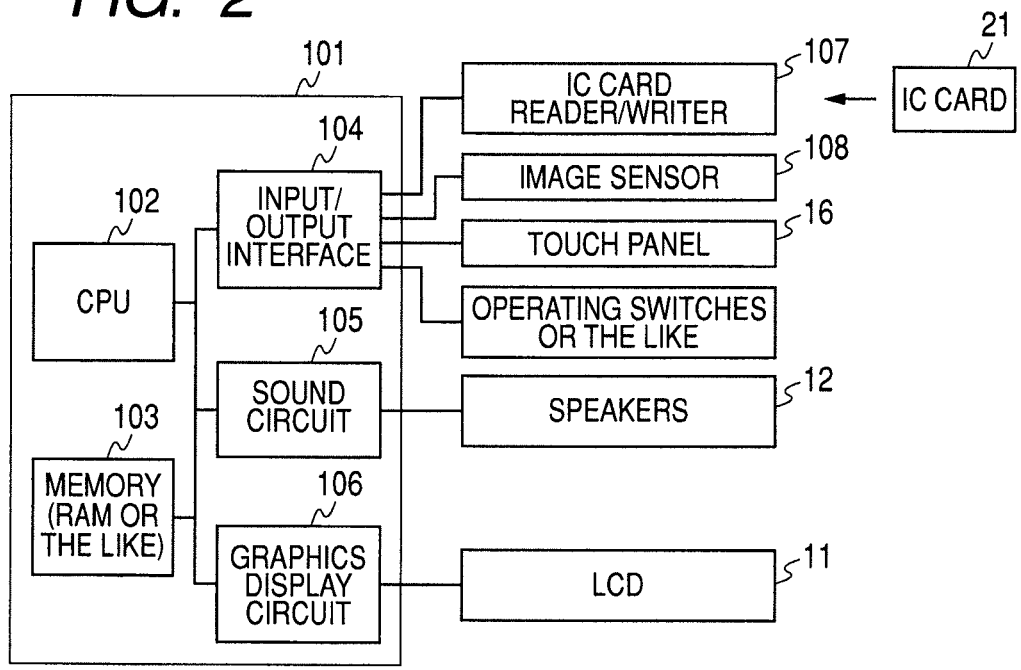
FIG. 2 is a block diagram showing a circuit configuration of the card game apparatus according to the embodiment of the invention.

FIG. 2 is a block diagram showing a configuration of the card game apparatus 1 of FIG. 1. As shown in the figure, the card game apparatus 1 is constructed centered on an apparatus main body 101. The apparatus main body 101 includes a CPU (Central Processing Unit) 102 connected to an internal bus thereof, a memory 103, an input/output interface 104, a sound circuit 105 and a graphics display circuit 106.

The CPU 102, executing a program stored in the memory 103, carries out a control of the apparatus main body 101. The CPU 102 includes an internal timer. The memory 103 is a storage area (a RAM, a ROM, an HDD or the like) for saving the program and data. Various image data to be displayed on the LCD 11, and the program, are stored in the memory 103.

The IC card reader/writer 107, the image sensor 108, the touch panel 16, the operating switches 14 and the like (including the card payout opening and the coin slot) are connected to the input/output interface 104. The IC card reader/writer 107, being mounted on the interior of the IC card slot 15, and connected to the IC card 21 inserted into the IC card slot 15, carries out a reading and writing of the data.

The image sensor 108 reads the card data stored on the back of the character card 20. The image sensor 108, based on an instruction from the CPU 102, reads an image on the card disposition panel 13 every $1/60$ second, and transmits the image data to the memory 103.

The image data transmitted every $1/60$ second from the image sensor 108 are temporarily saved in the memory 103, and the CPU 102 analyzes the image data. The same conditions as those of the heretofore known invention are used for the image data stored on the back of the character card 20. The CPU 102, by analyzing the image data, reads the data pattern on the back of each character card 20 placed on the card disposition panel 13, and determines a position and direction of the relevant character card 20 on the card disposition panel 13. Then, the CPU 102, in accordance with a result of the determination, determines a position and bodily direction, on a field of the virtual three-dimensional space, of a player character corresponding to each character card 20.

The touch panel 16 (including a device driver for the touch panel) transmits a pressed position on the card disposition panel 13 to a predetermined register provided in the memory 103. The CPU 102, by the output from the touch panel 16, identifies a character card 20 being pressed by the player, and designates a player character corresponding to the character card 20 as a selected character (to be described hereafter).

The operating switches 14 and the like are ones for inputting an instruction from the player. The input/output interface 104 transmits data input from the image sensor 108, operating switches 14, touch panel 16 and the like to the memory 103, and the CPU 102 interprets them and implements a calculation process. The input/output interface 104, also, based on the instruction from the CPU 102, causes data indicating a game implementation status (a result of a competition in the game, or the like), stored in the memory 103, to be saved in the IC card 21, retrieves data of the game at a time of interruption which are saved in the IC card 21, and transfers the data to the memory 103.

The sound circuit 105 is connected to the speakers 12. The sound circuit 105, in a case in which the program being executed by the CPU 102 instructs the sound circuit 105 to carry out a sound output, interprets the instruction, transmits a sound signal, and causes the speakers 12L and 12R, disposed in positions inside the heretofore described sound outlet apertures, to transmit a sound which is to be reproduced in accordance with the game being executed.

The graphics display circuit 106 is connected to the LCD 11. The graphics display circuit 106, in accordance with a drawing command transmitted from the CPU 102, expands an image in a frame memory (not shown, which is provided inside a RAM included in a chip configuring the graphics display circuit 106), and transmits a video signal for displaying an image on the LCD 11. A one-frame time of the image included in the video signal transmitted from the graphics display circuit 106 is, for example, $1/60$ second.

Data for carrying out the game on the card game apparatus 1 are stored first in, for example, the IC card 21. The data stored in the IC card 21, when executed, are read by the IC card reader/writer 107, and loaded into the memory 103. The CPU 102 processes the data loaded into the memory 103, and the program stored therein, transmits the drawing command to the graphics display circuit 106, and transmits the sound output instruction to the sound circuit 105. Intermediate data on the process being carried out by the CPU 102 are stored in the memory 103.

Hereafter, a description will be given of a game which, in the embodiment, is executed on the card game apparatus 1 shown in FIGS. 1 and 2. The game according to the embodiment is a trading card game carried out using cards, in which, a field being formed in a virtual three-dimensional space (a game space) serving as a player character movement space, the player causes a player character corresponding to a character card 20 to participate in the game, and implements the game while causing the player character to act (such as attacking an enemy character) on the field by the input from the operating switches 14, the touch panel 16 or the like.

The player, by placing a character card 20 on the card disposition panel 13, can cause a character, corresponding to the image data which the image sensor 108 has been caused to read, to participate in the game. In a game applied in this card game system, each player can cause three player characters to participate in the game. The player can cause a plurality of the player characters to participate in the game at one time, and a plurality of the player characters to behave at the same time.

A player team is formed by all the player characters caused to participate by the player. The player, by placing the character card 20 on the card disposition panel 13, can cause a degree of stamina of a character corresponding to the card data, included in the image data which the image sensor 108 has been caused to read, to be read from the IC card 21 and added as a degree of stamina of the player team. A sum of the degrees of stamina of all characters which the player has caused to participate in the game becomes the degree of stamina of the player team.

The enemy character also exists in the virtual three-dimensional space. It is acceptable that the enemy character is either one controlled by the CPU 102, or a player character which another player causes to participate in the game (provided that the card game apparatus 1 includes a communication device). In the same way as the player characters, a plurality (one or more, for example, three) of the enemy characters also form a team.

The game according to the embodiment configuring a plurality of stages, clearance conditions are set in each stage. Also, a time limit (for example, 160 seconds) being set in each stage, the player team suffers a defeat unless it can fulfill the clearance conditions set in the relevant stage within a time from the player characters being caused to participate in the game in each stage until the time limit elapses. The clearance conditions include, for example, a condition of causing the player characters to compete against the enemy characters, and reduce a degree of stamina of the enemy team to zero.

The game finishes in the event that the degree of stamina of the player team has decreased to zero, the clearance conditions have been fulfilled, or the clearance conditions have not been fulfilled when the time limit elapses. When the game finishes, one character card 20 is paid out from the card payout opening.

A position in the virtual three-dimensional space in which this field is formed is uniquely specified by coordinates of the world coordinate system (X, Y, Z). A player character is set with an approximately central point thereof as a fiducial point, and a position thereof in the virtual three-dimensional space is indicated by coordinates of the fiducial point in the world coordinate system. Also, a direction of the player character is expressed by an angle which each axis of the local coordinate system forms with each axis of the world coordinate system.

Figure 3:
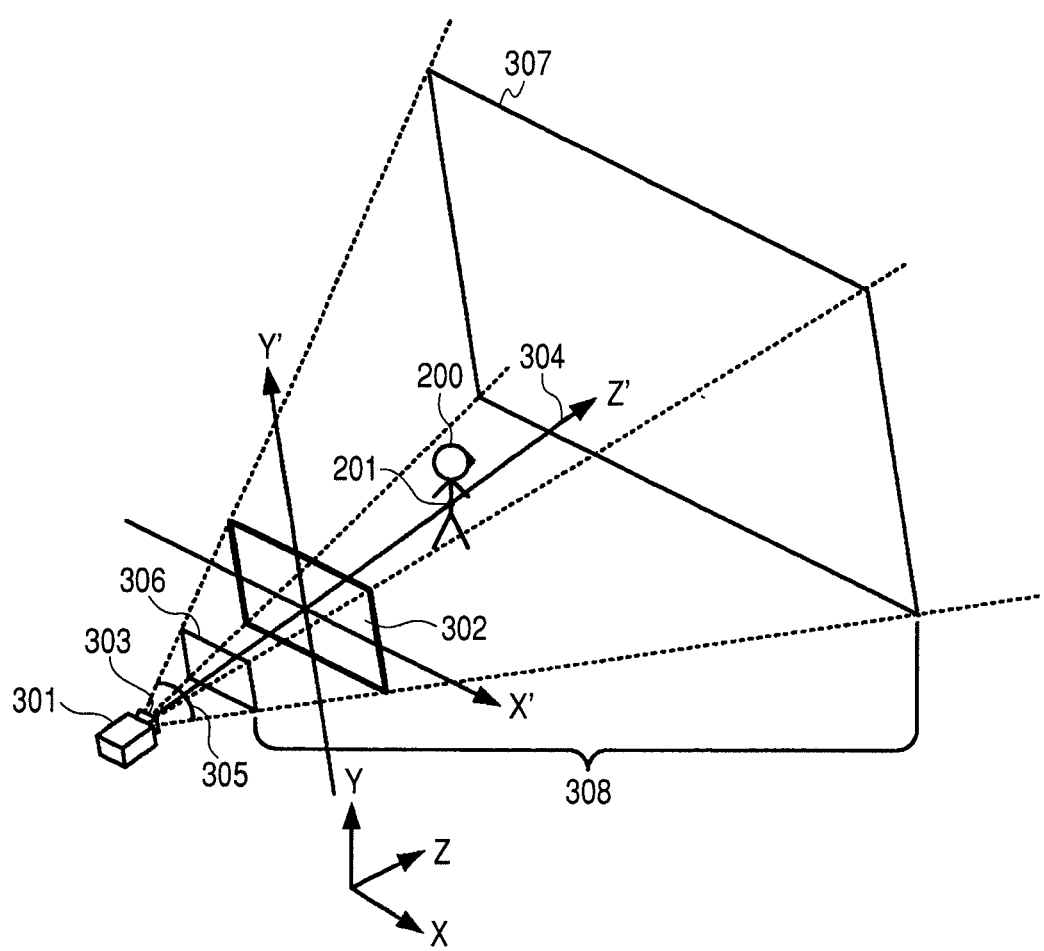
FIG. 3 is a view schematically showing a process for perspectively transforming and displaying a virtual three-dimensional space including a player character in a card game according to the embodiment of the invention.

An aspect in which a character inside the virtual three-dimensional space, including a player character, moves through the space is perspectively transformed onto an area set in a direction of a visual axis from a position of a visual point of a virtual camera, and an image thereof is displayed on the LCD 11. FIG. 3 is a view schematically showing an aspect in which the virtual three-dimensional space is perspectively transformed.

As shown in FIG. 3, a virtual camera 301 is put inside the virtual three-dimensional space. A position of the virtual camera 301 is a visual point 303, a direction of the virtual camera 301 is a visual axis 304, and an area defined by four straight lines which connect the visual point 303 and four corners of vertices of a virtual screen 302 is a visual field 305. The virtual screen 302 is put in a position located a predetermined short distance from the visual point 303 in a direction of the visual axis 304.

Within a range of the visual field 305, a front grip plane 306 is set a predetermined short distance from the visual point 303 in the direction of the visual axis 304, and a back grip plane 307 is set a predetermined long distance away. Within the range of the visual field 305, a range from the front grip plane 306 to the back grip plane 307 is fixed as a visual field space 308 which is a range in which an image is drawn by the perspective transformation.

In this way, a coordinate system used for projecting an image onto the virtual screen 302 being a visual point coordinate system (X', Y', Z'), the direction of the visual axis 304 is a Z' axis of the visual point coordinate system. Coordinates of the world coordinate system (including coordinates converted from coordinates of the local coordinate system) are converted into coordinates of the visual point coordinate system, and a perspective transformation process, including a hidden surface removal process, is carried out. The graphics display circuit 106 draws in the frame memory the image projected onto the virtual screen 302 by the perspective transformation.

As a premise for carrying out the perspective transformation, it is necessary to determine in advance the position of the visual point 303 of the virtual camera 301, the direction of the visual axis 304 thereof, a size of the visual field 305 (a distance from the visual point 303 to the virtual screen 302), and a size of the visual field space 308 (a distance from the visual point 303 to the front grip plane 306 and the back grip plane) (when they are determined, a position of the virtual screen 302 is automatically determined). It is taken that the size of the visual field 305, and the visual field space 308, are set to be basically of the same size.

The position of the visual point 303 and the direction of the visual axis 304 are determined by a predetermined method. Next, a description will be given, using FIGS. 4A and 4B, of a method which determines the position of the visual point 303 and the direction of the visual axis 304. A player character 200 corresponding to a character card 20 last placed on (that is, pressed or being pressed against) the card disposition panel 13 by the player immediately after the start of the game is designated as the selected character. The player, by touching (that is, having pressed or pressing) an optional card placed on the card disposition panel 13, can designate a player character 200 corresponding to the character card 20 as the selected character. When a new selected character is designated, the designation of the previous selected card is cancelled.

Figure 4A:
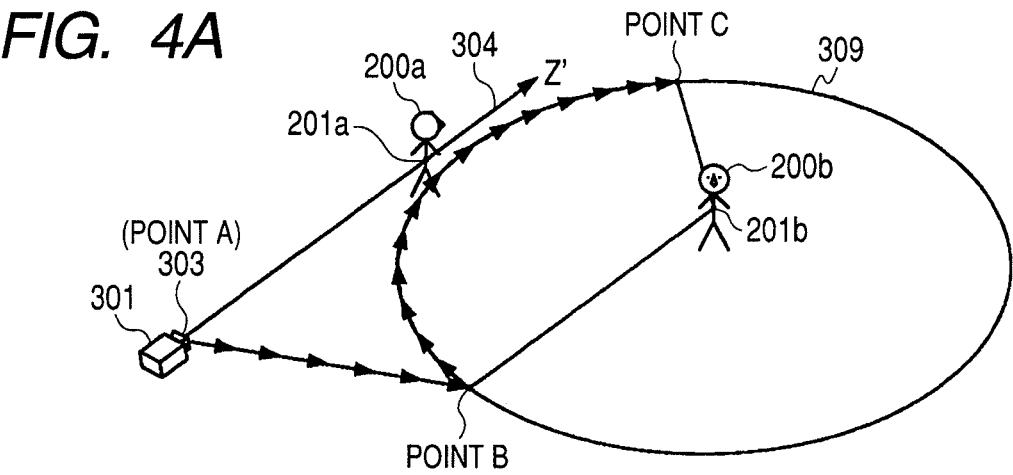
FIGS. 4A and 4B are views illustrating a method which determines a position of a visual point, and a direction of a visual axis, in the card game apparatus according to the embodiment of the invention.
Figure 4B:
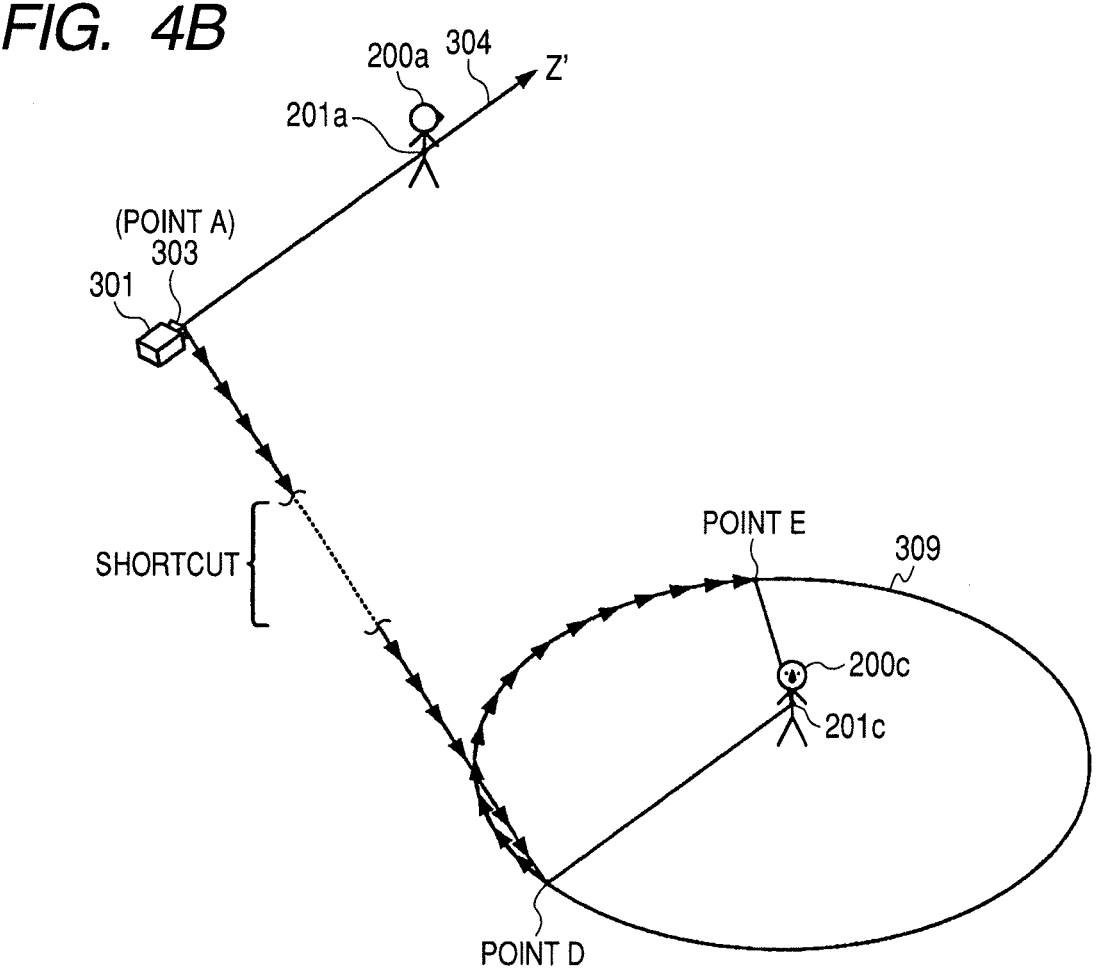

In FIGS. 4A and 4B, the player character 200a is designated as the selected character. A fiducial point 201a of a player character 200a designated as the selected character is set as a reference point, and the direction of the visual axis 304 is set in a direction (a back to front direction) of the player character 200a. In the event that the reference point and the direction of the visual axis 304 are set, the visual point 303 is set at a point A located a predetermined distance on the visual axis 304 from the reference point (hereafter, a visual point distance). This condition is referred to as the visual point 303 being set for the selected character.

In the event that a character card 20 other than a character card 20 corresponding to the player character 200a designated as the selected character at the present time (hereafter referred to as an old selected character) is touched on the card disposition panel 13, a player character 200b corresponding to the touched character card 20 (hereafter referred to as a new selected character) is newly designated as the selected character. By the selected character being changed from the player character 200a to the player character 200b, the position of the visual point 303 moves on arrows from the point A to a point B, and from the point B to a point C.

In a case in which the selected character is changed to the player character 200b, the fiducial point 201a of the player character 200a, a position of a fiducial point 201b of the player character 200b, and a direction of the player character 200b are temporarily saved in the memory 103, respectively, as a start point, a finish point, and a direction of the new selected character. In the event that the selected character is changed, a distance between the player character 200a and the player character 200b is calculated. In the event that the distance between the player character 200a and the player character 200b is short, by the selected character being changed from the player character 200a to the player character 200b, the position of the visual point 303 moves on the arrows from the point A to the point B, and from the point B to the point C.

By the selected character being changed, the position of the visual point 303 moves at a predetermined speed in a straight line, parallel to a straight line connecting the position of the start point and the position of the finish point, while maintaining the direction of the visual axis 304. The position of the visual point 303, while maintaining the direction of the visual axis 304, moves on the visual axis 304 at the predetermined speed in the direction of the player character 200b until a distance between the position of the visual point 303 and the fiducial point 201b becomes the visual point distance.

In the event that, by the visual point 303 being moved, the finish point (the fiducial point 201b of the player character 200b) is positioned in a position located at the visual point distance on the visual axis 304 from the visual point 303, the finish point becomes the reference point. The movement from the new selected character being designated until the finish point becomes the reference point (from the point A to the point B) will hereafter be referred to as a parallel movement of the visual point 303. A path along which the parallel movement of the visual point 303 is carried out (that is, the straight line connecting the point A and the point B. Hereafter referred to as a parallel movement path) is determined when the new selected character is designated. The parallel movement of the visual point 303 is carried out for a regulation time (for example, one second) regardless of a length of the parallel movement path. Consequently, a moving speed of the visual point 303 while the parallel movement of the visual point 303 is being carried out is determined in accordance with the length of the parallel movement path.

When the parallel movement of the visual point 303 finishes, and the fiducial point 201b of the player character 200b becomes the reference point (when the visual point 303 is positioned at the point B), in the event that the direction of the visual axis 304 differs from the direction (the back to front direction) of the player character 200b, the visual point 303, while maintaining the fiducial point 201b as the reference point, moves circularly at a predetermined speed, on a visual point circle 309 having the visual point distance as a radius from the reference point (the fiducial point 201b), to a position (the point C) in which the direction of the visual axis 304 becomes the same as the direction (the back to front direction) of the player character 200b. A direction in which the circular movement is carried out is determined to be a direction in which a circular movement distance of the visual point 303 becomes short (that is, a direction in which a rotation angle becomes small). For example, the circular movement direction of the visual point 303 can be determined depending on which of semicircles, into which a straight line passing through the position of the visual point 303 when the parallel movement finishes, and through the fiducial point 201b, divides the visual point circle 309, includes a point at which a straight line drawn in a front to back direction of the player character 200b intersects with the visual point circle 309.

The reference point is fixed while the visual point 303 moves circularly and, by the direction of the visual axis 304 being decided, the position of the visual point 303 is determined. When the circular movement of the visual point 303 finishes, the start point, the finish point, and the direction of the new selected character, stored in the memory 103, are deleted. When the circular movement of the visual point 303 finishes, the position of the visual point 303 is set at a position (the point C) located the visual point distance in the direction of the visual axis 304 set in the direction (the back to front direction) of the player character 200b from the reference point which is the fiducial point 201b of the player character 200b.

In a case in which the distance between the player character 200a and the player character 200c is long (the length of the parallel movement path is long) as shown in FIG. 4B, in the event that the selected character is changed to the player character 200c, the moving speed of the visual point 303 while the parallel movement of the visual point 303 is being carried out (from the point A to a point D) becomes high. A maximum threshold value being fixed for the moving speed of the visual point 303, in the event that the distance between the player character 200a and the player character 200c is long (the length of the parallel movement path is long), the movement of the visual point 303 is short-cut partway through the parallel movement path (one portion from the point A to the point D) in such a way that the moving speed does not exceed the threshold value during the parallel movement of the visual point 303. The shortcut of the movement of the visual point 303 is carried out for a predetermined time (for example, 0.2 seconds).

In the event that the length of the parallel movement path determined when the new selected character is designated exceeds a predetermined value, shortcut start and finish points are determined, and a time required for the parallel movement of the visual point 303 (including a shortcut time) is adjusted in such a way as to become one second (the regulation time). The shortcut start and finish points are determined to be in a vicinity of an intermediate section of the parallel movement path. In the event that the visual point 303 is positioned at the shortcut start point due to the parallel movement of the visual point 303, a timing by a shortcut timer is started. During the timing by the shortcut timer, an image specific to the shortcut is displayed on the LCD 11.

As the image specific to the shortcut, it is acceptable to adopt, for example, an animated image which switches between images corresponding to positions of the visual point 303 every 0.2 seconds, or one which switches between an image in a condition in which the visual point 303 is positioned at the shortcut start point, and an image in a condition in which the visual point 303 is positioned at the shortcut finish point. No mater what the image displayed during the shortcut may be, no limitation of the heretofore described threshold value is set on the moving speed of the visual point 303 during the shortcut.

When the shortcut timer times 0.2 seconds, the timing by the shortcut timer finishes, the visual point 303 is moved to the shortcut finish point, and the parallel movement of the visual point 303 is started again. Then, when the visual point 303 is positioned at the point D, the parallel movement finishes, and the circular movement is carried out as far as a point E.

Figure 5:
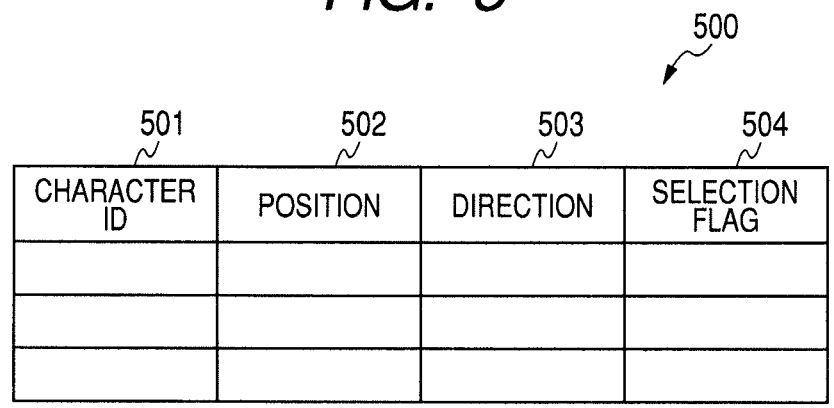
FIG. 5 is a diagram illustrating a character table which is managed in a memory in order to carry out the card game on the card game apparatus according to the embodiment of the invention.

Next, a description will be given of data managed in the memory 103 in order to carry out the card game on the card game apparatus 1. FIG. 5 is a diagram showing a character table 500 provided in the memory 103 inside the card game apparatus 1. As shown in the figure, a character ID 501, a position 502, a direction 503 and a selection flag 504 are registered in the character table 500 for each player character 200.

As it is possible for one player to cause three player characters 200 to participate at one time in the card game according to the embodiment, spaces in which the three player characters 200 can be registered are provided in the memory 103. In the character table 500, numbers 1 to 3 being allotted in order from the top, data on character cards 20 are registered from the top in an order in which the player places them on the card disposition panel 13. The character ID 501 is identification information which uniquely identifies each player character 200.

The position 502 indicates a position of a player character 200 in the game space by coordinates set in the game space. The direction 503 indicates a direction in which the player character 200 faces, for example, by a range of 0 to 359 degrees with a predetermined direction in the game space as a reference direction (a direction of 0 degrees). The selection flag 504 is a flag set for a player character 200 selected as the selected character. It does not happen that a plurality of the selection flags 504 are set in the character table 500. In the event that a selection flag 504 is set for one player character 200, a selection flag 504 set for another player character is reset.

Hereafter, a description will be given of a process for carrying out the card game according to the embodiment on the card game apparatus 1. There is a case in which a process other than a process specific to the embodiment is omitted from a description. Also, information on the process carried out partway by the CPU 102 is temporarily stored in a work area of the memory 103.

Figure 6:
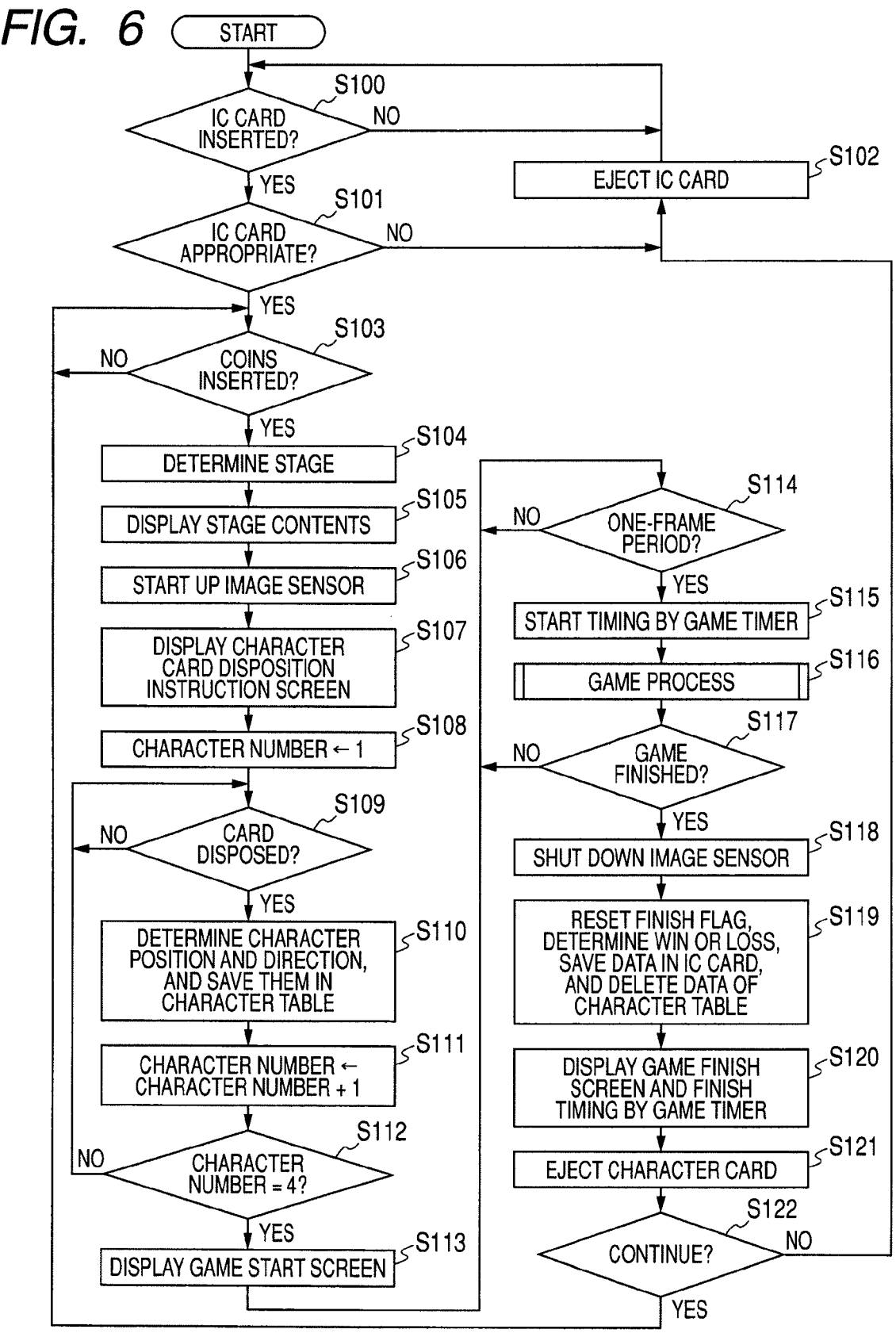
FIG. 6 is a flowchart showing a main process executed in the card game apparatus according to the embodiment of the invention.

FIG. 6 is a flowchart showing a main process executed in the card game apparatus 1. When the apparatus main body 101 of the card game apparatus 1 is powered on, START information is input into the CPU 102, and the main process is started.

The CPU 102 determines whether or not the IC card 21 is inserted in the IC card slot 15 (step S100). If the IC card 21 is not inserted, the CPU 102 repeats the process of step S100, and waits for the IC card 21 to be inserted. If the IC card 21 is inserted, the CPU 102 checks data read from the IC card 21 by the IC card reader/writer 107, and determines whether or not the IC card 21 is appropriate for a game to be carried out on the relevant card game apparatus 1 (step S101). If the IC card 21 is not appropriate for the game, the CPU 102 ejects the IC card 21 from the IC card slot 15 (step S102). Then, the CPU 102 returns to the process of step S100.

If the IC card 21 is appropriate for the game, the CPU 102 determines whether or not there has been an insertion of coins of an amount which is paid for the game from the coin slot (step S103). If there is no insertion of coins, the CPU 102 repeats a process of step S103, and waits for coins to be inserted. If coins have been inserted, the CPU 102, in accordance with the data read from the IC card 21 by the IC card reader/writer 107, determines a stage to be carried out this time (step S104). Then, the CPU 102 issues a drawing command to the graphics display circuit 106 so as to display the clearance conditions of the stage, information on the enemy team, and the like, on the LCD 11 (step S105).

The CPU 102 issues a command to the input/output interface 104 so as to start up the image sensor 108. Then, the CPU 102 issues a command to the image sensor 108, and causes it to transmit the image data on the card disposition panel 13 to the memory 103 (step S106). The CPU 102 issues a drawing command to the graphics display circuit 106 so as to display an image on the LCD 11 which instructs the player to position three character cards 20 (step S107). The CPU 102 assigns an initial value 1 to a character number (step S108).

The CPU 102 analyzes the image data transmitted to the memory 103 and, depending on whether or not data of the character cards 20 are included therein, determines whether or not the character cards 20 have been placed on the card disposition panel 13 (step S109). If the data of the character cards 20 are not included in the image data read by the image sensor 108, the CPU 102 returns to the process of step S109, and waits until a new character card 20 is placed on the card disposition panel 13.

If a new character card 20 is placed on the card disposition panel 13, the CPU 102 determines information on the character card 20 (a character ID), and a position and direction in which each character card 20 is placed, and saves a position and direction on the field of a player character 200 corresponding to the character card 20 in a position 502 and direction 503 in the character table 500 which correspond to a present character number. If the present character number is 3, the CPU 102 sets a selection flag 504 for the player character 200 (step S110).

The CPU 102 adds 1 to the character number, and assigns an obtained value to the character number (step S111). Then, the CPU 102, depending on whether or not the character number has become 4, determines whether or not three character cards 20 have been placed on the card disposition panel 13 (step S112). If the character number is not 4, the CPU 102 returns to the process of step S109. If the character number is 4, as it means that three character cards 20 have been disposed, the CPU 102 issues a drawing command to the graphics display circuit 106 so as to cause a display on the LCD 11 indicating a starting of a game corresponding to the stage determined in the process of step S104 (step S113).

The CPU 102 determines whether or not a one-frame period of $1/60$ second has elapsed (step S114). If the one-frame period has not elapsed, the CPU 102 returns to the process of step S114, and waits until the one-frame period elapses. If the one-frame period has elapsed, the CPU 102, using its internal timer, starts a timing by a game timer (step S115).

Then, the CPU 102 carries out a game process corresponding to the stage (step S116). The game process is a process which, being executed every time the elapsing of the one-frame period is determined, is carried out particularly in order to display an image on the LCD 11. Details of the game process will be described hereafter. Then, after a finish of the game process, the CPU 102, depending on whether or not a finish flag is set in the memory 103, determines whether or not a game has finished (step S117). If the game has not finished, the CPU 102 returns to the process of step S114. If the game has finished, the CPU 102 issues a command to the input/output interface 104 so as to shut down the image sensor 108 (step S118).

The CPU 102 resets the finish flag set in the memory 103, and carries out a win or loss determination for determining which team has won. Herein, in the event that the degree of stamina of the player team has decreased to zero, the player team loses in the event that it has not fulfilled the clearance conditions when the time limit elapses, while in the event that the degree of stamina of the enemy team has decreased to zero, the player team wins in the event that it has fulfilled the clearance conditions within the time limit. The CPU 102 calculates parameters of each player character 200 participating in the game, and their team, and stores the calculated parameters in the IC card 21. The CPU 102 deletes the data registered in the character table 500 (step S119).

The CPU 102 issues a drawing command to the graphics display circuit 106 so as to cause a display on the LCD 11 indicating that the game has finished. Then, the CPU 102 finishes the timing by the game timer (step S120). The CPU 102 pays out one character card 20 from the card payout opening (step S121). Then, depending on whether or not the A button 14a has been operated, the CPU 102 determines whether or not an instruction to continue the game has been input by the player (step S122). If the instruction to continue the game has been input, the CPU 102 returns to the process of step S103. If the instruction to continue the game has not been input, the CPU 102 returns to the process of step S102, and ejects the IC card 21 from the IC card slot 15.

Figure 7:
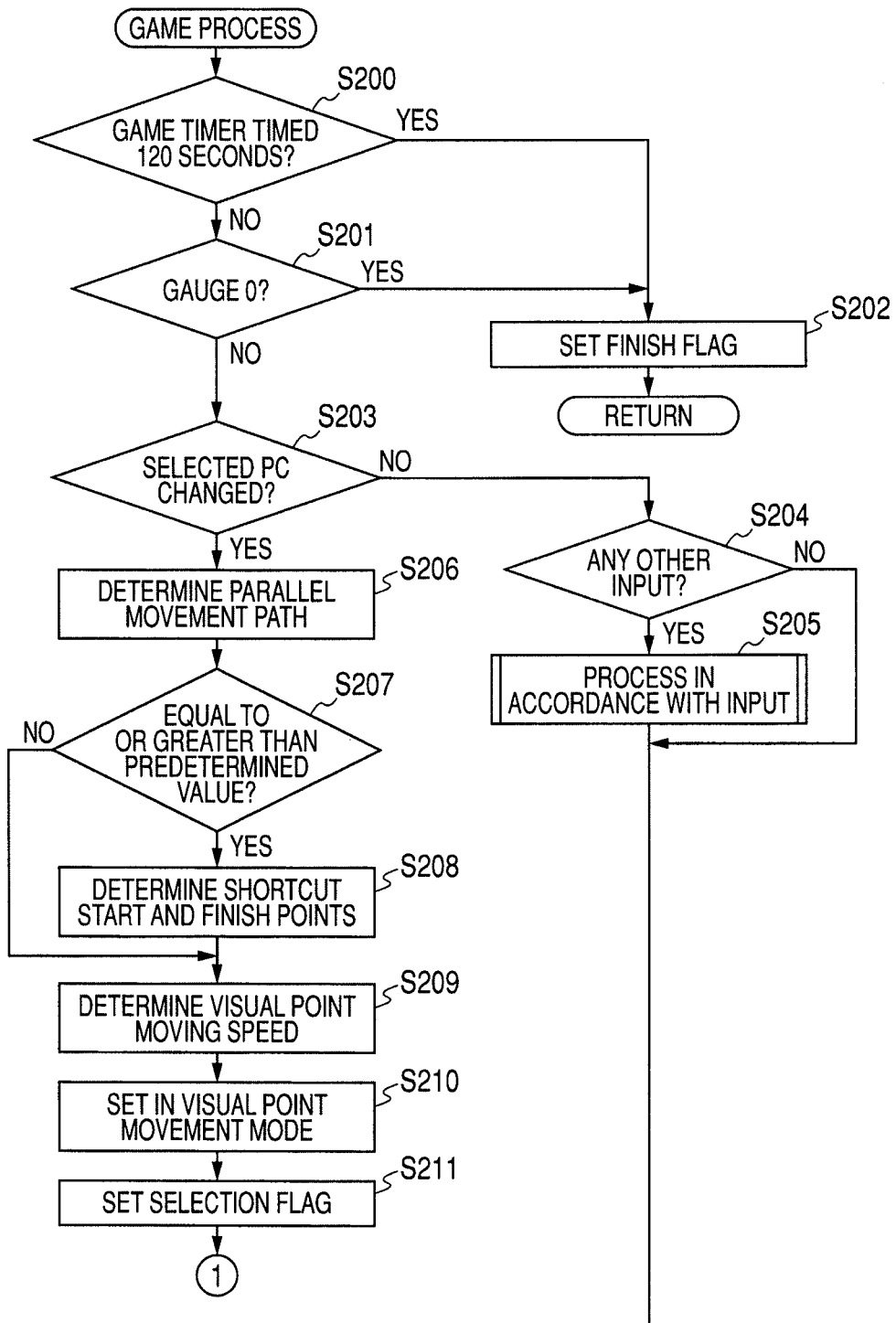
FIG. 7 is a flowchart showing in detail the game process of FIG. 6.

FIG. 7 is a flowchart showing in detail the game process executed in step S116 of FIG. 6. The game process is a process which finishes within at least 1/60 second. In the game process, the CPU 102 determines whether or not the game timer which its internal timer times has timed 120 seconds (step S200). If the game timer has timed 120 seconds, the CPU 102 proceeds to a process of step S202. If the game timer has not timed 120 seconds, the CPU 102 determines whether or not a sum of the degrees of stamina of either team has decreased to zero (step S201).

If the sum of the degrees of stamina of either team has decreased to zero, the CPU 102 proceeds to the process of step S202. In step S202, the CPU 102 sets a finish flag in the memory 103. Then, the CPU 102 finishes the game process, and returns to the processes of the flowchart of FIG. 6.

If the sum of the degrees of stamina of either team has not decreased to zero, the CPU 102, depending on whether or not a position on the touch panel 16 which has been input by touching from the touch panel 16 is a position of a character card 20 corresponding to a player character 200 other than a present selected character (a player character for which a selection flag 504 is set), determines whether or not the change of the selected character has been carried out (step S203).

If the change of the selected character has not been carried out, the CPU 102 determines whether or not another input has been carried out from the operating switches 14, the touch panel 16 or the like (step S204). If no other input has been carried out, the CPU 102 proceeds to a process of step S212. If the other input has been carried out, the CPU 102 carries out a process corresponding to the input (for example, the movement, the change in the direction, and the like, of the character card 20) (step S205). Then, the CPU 102 proceeds to the process of step S212.

If the change of the selected character has been carried out, the CPU 102 saves the start point, the finish point, and the direction 503 of the new selected character in a predetermined area of the memory 103. Herein, the position 502 of the old selected character (of the player character 200 for which the selection flag 504 of the character table 500 is set at the present time) is saved for the start point, and the position 502 of the new selected character is saved for the finish point. The CPU 102 determines the parallel movement path by a distance between the start point and the finish point (step S206). If the visual point movement mode is set in step S206, the CPU 102 cancels the visual point movement mode.

The CPU 102 determines whether or not the length of the parallel movement path exceeds a predetermined value (step S207) If the predetermined value is not exceeded, the CPU 102 proceeds to a process of step S209. If the predetermined value is exceeded, the CPU 102 determines the shortcut start and finish points (step S208). Then, the CPU 102 proceeds to the process of step S209.

In step S209, the CPU 102 determines the moving speed of the visual point 303 from the length of the parallel movement path of the visual point 303 (excluding a shortcut section), and the regulation time (one second) of the parallel movement (step S209). Then, the CPU 102 sets the visual point movement mode (step S210). The CPU 102 resets the selection flag 504 set for the old selected character, and sets a selection flag 504 for the new selected character (step S211). Then, the CPU 102 finishes the game process, and returns to the processes of the flowchart of FIG. 6.

In step S212, the CPU 102 determines whether or not the visual point movement mode is set. If the visual point movement mode is not set, the CPU 102 finishes the game process, and returns to the processes of the flowchart of FIG. 6. If the visual point movement mode is set, the CPU 102, depending on whether or not the reference point located the visual point distance in the direction of the visual axis 304 from the visual point 303 moving in parallel is positioned in the position of the finish point (the fiducial point 201 of the player character 200 designated as the new selected character), determines whether or not the parallel movement has finished (step S213).

If the parallel movement has not finished, the CPU 102 determines whether or not the shortcut timer is in the process of timing (step S214). If the shortcut timer is in the process of timing, the CPU 102 determines whether or not the shortcut timer has timed 0.2 seconds (step S215). If 0.2 seconds has not been timed, the CPU 102 finishes the game process, and returns to the processes of the flowchart of FIG. 6. If 0.2 seconds has been timed, the CPU 102 moves the position of the visual point 303 to the shortcut finish point, and finishes the timing by the shortcut timer (step S216). Then, the CPU 102 finishes the game process, and returns to the processes of the flowchart of FIG. 6.

If the shortcut timer is not in the process of timing, the CPU 102 moves the position of the visual point 303 on the parallel movement path at the moving speed determined in the process of step S209 (step S217). Then, the CPU 102 determines whether or not the position of the visual point 303 is positioned at the shortcut start point (step S218). If it is not positioned at the shortcut start point, the CPU 102 finishes the game process, and returns to the processes of the flowchart of FIG. 6. If it is positioned at the shortcut start point, the CPU 102 starts the timing by the shortcut timer (step S219), finishes the game process, and returns to the processes of the flowchart of FIG. 6.

If the parallel movement has finished, the CPU 102, depending on whether or not the direction of the visual axis 304 has become the same as the direction 503 of the new selected character, determines whether or not the circular movement has finished (step S220). If the circular movement has finished, the CPU 102 proceeds to a process of step S223. If the circular movement has not finished, the CPU 102 circularly moves the position of the visual point 303 on the visual point circle 309 by a predetermined amount from the present position of the visual point 303 (step S221).

Then, the CPU 102, depending on whether or not the direction of the visual axis 304 has become the same as the direction 503 of the new selected character, determines whether or not the circular movement has finished (step S222). If the circular movement has not finished, the CPU 102 finishes the game process, and returns to the processes of the flowchart of FIG. 6. If the circular movement has finished, the CPU 102 proceeds to the process of step S223. In step S223, the CPU 102 cancels the visual point movement mode. Then, the CPU 102 finishes the game process, and returns to the processes of the flowchart of FIG. 6.

As described heretofore, in the card game according to the embodiment, in a case in which the change of the selected character has been carried out by the operation of the player, the visual point 303 moves circularly after moving in parallel. The parallel movement of the visual point 303 is carried out, while maintaining the direction of the visual axis 304, until the fiducial point 201 of the new selected character becomes the reference point, on the straight line parallel to the straight line connecting the previous start point (the fiducial point 201 of the old selected character) and the finish point (the fiducial point 201 of the new selected character). After the parallel movement of the visual point 303 finishes, the visual point 303 is circularly moved, while maintaining the fiducial point 201 of the new selected character as the reference point, until the direction of the visual axis 304 becomes the direction (the back to front direction) of the new selected character.

As the direction of the visual axis 304 is constant while the parallel movement of the visual point 303 is being carried out, the game image displayed on the LCD 11 also only flows in parallel, and no distortion occurs in the game image. Also, while the circular movement (a rotational movement) of the visual point 303 is being carried out, as the visual point 303 maintains the reference point as the fiducial point 201 of the new selected character, the player can perceive the new selected character, which has high visibility, in a center of the game image displayed on the LCD 11, and is not much annoyed by a change in a surrounding image.

By this means, it is possible to prevent the player from suffering from camera sickness by watching an image displayed on the LCD 11 in a process until the visual point 303 and the visual axis 304 are controlled from a condition of the visual axis 304 of the visual point 303 which corresponds to the old selected character, to a condition thereof corresponding to the new selected character. Also, it is possible for the controls of the visual point 303 and visual axis 304 to be realized by relatively simple controls which are the parallel movement and the circular movement.

Also, the parallel movement of the visual point 303 is carried out for the regulation time (for example, one second). In this case, in the case in which the change of the selected character has been carried out by the operation of the player, even in the event that the distance between the old selected character and the new selected character in the virtual three-dimensional space is long, the parallel movement of the visual point 303 being carried out for the regulation time (for example, one second), it does not happen that a time for the parallel movement becomes too long. Also, the limitation being set on the speed at which the position of the visual point 303 is circularly moved after the parallel movement, as a rotation angle of the circular movement also only reaches 180 degrees at a maximum, the circular movement of the visual point 303 is also carried out within a predetermined time, meaning that it does not happen that a time for the circular movement becomes too long, either.

This kind of time for which the parallel movement and circular movement of the visual point 303 are carried out is a time for which the player cannot operate any character, and a time for which the player is merely watching the game image displayed on the LCD 11. In the event that the time for which the player is merely watching the game image is long, there is a fear of reducing the interest of the player in the game. By setting the limitation on the time for which the parallel movement and circular movement of the visual point 303 are carried out, it is possible to arrange in such a way as not to reduce the interest of player in the game.

Also, the speed at which the parallel movement of the visual point 303 is carried out, being determined in accordance with the length of the parallel movement path when the selected character is changed, is set with the maximum threshold value. Consequently, the speed at which the parallel movement of the visual point 303 is carried out being equal to or lower than the predetermined speed, as it does not happen that the change in the game image displayed on the LCD 11 becomes too large while the parallel movement of the visual point 303 is being carried out, it is possible to further prevent the camera sickness.

Also, in the case in which the change of the selected character has been carried out by the player, in the event that the distance between the old selected character and the new selected character is long (the length of the parallel movement path is long), and the moving speed of the visual point 303 while the parallel movement of the visual point 303 is being carried out (the parallel movement path) exceeds the maximum threshold value, one portion of the movement of the visual point 303 is short-cut partway along the parallel movement path in such a way that the speed of the parallel movement of the visual point 303 does not exceed the threshold value. The shortcut of the movement of the visual point 303 is carried out for the predetermined time (0.2 seconds), and the image specific to the shortcut is displayed during the shortcut.

In this way, the limitation is set on the time for, and the speed at which the parallel movement of the visual point 303 is carried out and, in the event that the limitation is exceeded, one portion of the parallel movement is short-cut, whereby it neither happens that the time for which the parallel movement of the visual point 303 becomes too long, nor that the speed of the parallel movement becomes too high. Also, even in the event that the movement of the visual point 303 is short-cut, as long as the shortcut is carried out in one partial intermediate portion of the parallel movement, it not happening that a change in an image displayed at a timing immediately after a movement of the visual point 303 which gives a particularly strong visual impression to the player, or at a timing immediately before the movement finishes, becomes too large, it is possible to suppress the camera sickness due to the shortcut as far as is possible.

Also, whether or not the shortcut is to be carried out is determined depending on whether or not the length of the parallel movement path exceeds the predetermined value when the new selected character is designated. For this reason, it being possible to determine whether or not to carry out the parallel movement of the visual point by a relatively simple method, the process is not complicated.

Also, as an arrangement is such that the circular movement of the visual point 303 is carried out at the predetermined speed, it not happening that the change in the image during the circular movement becomes too large due to the speed at which the circular movement of the visual point 303 is carried out becoming too high, it is possible to further prevent the camera sickness.

Also, an arrangement is such that the direction in which the circular movement of the visual point 303 is carried out is determined to be the direction in which the circular movement distance of the visual point 303 becomes short (that is, the direction in which the rotation angle becomes small). By this means, it is possible to shorten the time for which the circular movement is carried out, in comparison with a case in which the circular movement of the visual point 303 is carried out in a direction in which the rotation angle is large. Also, as it is possible to reduce the rotation angle of the circular movement of the visual point 303 as far as is possible, it is easy for the player to ascertain how much the visual point 303 has been circularly moved.

Also, an arrangement is such that the change of the selected character is carried out by touching a character card 20 other than a character card 20, from among character cards 20 placed on the card disposition panel 13, which corresponds to the player character 200 designated as the selected character. In this case, the player can intuitively designate a desired player character 200 as the selected character by touching a corresponding character card 20 him or herself, resulting in an improvement in operability. Also, the card disposition panel 13, being the plane corresponding to the virtual two-dimensional plane perpendicular to the height direction of the virtual three-dimensional space, corresponds to the game image displayed on the LCD 11. Consequently, the player can ascertain a positional relationship of a player character 200 through a position of a character card 20 placed on the card disposition panel 13.

Also, each player character 200 is disposed in a position on the field formed in the virtual three-dimensional space, in a bodily direction determined in accordance with a position and direction of a corresponding character card 20 placed on the card disposition panel 13. In this case, the player can easily change the position and direction of the player character 200 in the virtual three-dimensional space by changing the position and direction of the character card 20 placed on the card disposition panel 13. Also, a complicated operation is not necessary for the disposition of the player character 200, that is, the disposition of the character card 20.

Also, the player character 200 corresponds to a tangible character card 20 and, the more kinds of character card 20 the player owns, the more options of usable player characters 200 increase. By this means, there occurs not only pleasure in merely playing a game, but also enjoyment in collecting character cards 20 to be used in the game.

Meanwhile, the following methods can be considered in the event that, when a new character differing from the previously selected character is selected, the heretofore described kind of method configuring two stages of the parallel movement and the circular movement is not applied as a method of controlling from the position of the visual point 303, and the visual axis 304, set in accordance with the old selected character, until the position of the visual point 303, and the visual axis 304, in accordance with the new selected character.

First, a method can be considered which switches instantaneously from the position of the visual point 303, and the direction of the visual axis 304, corresponding to the old selected character (in the example of FIG. 4A, a condition in which the visual point 303 is positioned at the point A, and the character 200a is the reference point) to the position of the visual point 303, and the direction of the visual axis 304, corresponding to the new selected character (in the example of FIG. 4A, a condition in which the visual point 303 is positioned at the point C, and the character 200b is the reference point). However, in this case, the positional relationship between the old selected character and the new selected character becomes difficult to understand from the image displayed on the LCD 11. Also, a quantity of virtual cameras is infinite no matter how large a quantity of characters which can participate in the game may become, which is inconsistent with the fact that a quantity of cameras is also physically limited in the realistic world, and there is a fear of making the player feel an anomaly.

Next, a method can be considered which first moves only the position of the visual position 303 from the position (in the example of FIG. 4A, the point A) fixed in accordance with the old selected character to the position (in the example of FIG. 4A, the point C) last fixed in accordance with the new selected character and, after that, changes the direction of the visual axis 304 until the visual axis 304 faces the new selected character. However, in this case, there is a case in which an image diverging from both the old and new characters is displayed when the visual point 303 is moving linearly, and there is no place which can catch the attention of the player on the screen when the visual axis 304 is rotating. For this reason, there is a fear that the positional relationship between the old selected character and the new selected character becomes difficult to understand from the image displayed on the LCD 11, and also that the player suffers from the camera sickness when the visual axis 304 is being rotated.

Next, a method can be considered which, while linearly moving the position of the visual point 303 from the position (in the example of FIG. 4A, the point A) fixed in accordance with the old selected character to the position (in the example of FIG. 4A, the point C) fixed in accordance with the new selected character, changes the direction of the visual axis 304, partway through the movement, to a direction from the last position of the visual point 303 to the new selected character (in the example of FIG. 4A, a direction from the point C to the fiducial point 201b). However, in this case, as the position of the visual point 303 moves while the direction of the visual axis 304 is changing, a distortion occurs in the image displayed on the LCD 11, and the positional relationship between the old selected character and the new selected character becomes difficult to understand.

Furthermore, apart from these, a method can also be considered which, in combination with a method, relatively unlikely to cause the camera sickness, which, in a circular orbit or an elliptical orbit, moves the position of the visual point 303 on the orbit while always directing the visual axis 304 toward a center, controls from the position of the visual point 303, and the direction of the visual axis 304, corresponding to the old selected character (in the example of FIG. 4A, the visual point 303 is positioned at the point A, and the character 200a is the reference point) to the position of the visual point 303, and the direction of the visual axis 304, corresponding to the new selected character (in the example of FIG. 4A, the visual point 303 is positioned at the point C, and the character 200b is the reference point). However, in this case, the process becomes too complicated.

In any case, there is none other than the combination of the parallel movement and the circular movement, such as that of the heretofore described embodiment, which can achieve all the advantages of, when controlling the position of the visual point 303 and the direction of the visual axis 304 from a condition corresponding to the old selected character to a condition corresponding to the new selected character, making the positional relationship between the old selected character and the new selected character easy to understand with a simple process, and further preventing the camera sickness of the player too.

The invention not being limited to the heretofore described embodiment, various modifications and applications are possible. Hereafter, a description will be given of modified aspects of the heretofore described embodiment which are applicable to the invention.

In the heretofore described embodiment, an arrangement is such that, by the new selected character being designated, the visual point 303, after moving in parallel, moves circularly. As opposed to this, it is also acceptable to arrange in such a way that the visual point 303, after moving circularly, moves in parallel. In this case, in the event that the selected character has been changed, the visual point 303, while maintaining the fiducial point 201 of the old selected character as the reference point, moves circularly until the direction of the visual axis 304 becomes the direction (the back to front direction) of the old selected character and, after that, while maintaining the direction of the visual axis 304, moves on the straight line parallel to the straight line connecting the start point (the fiducial point 201 of the old selected character) and the finish point (the fiducial point 201 of the new selected character), until the fiducial point 201 of the new selected character becomes the reference point. In this way, in a case of moving the visual point 303 in an order of the circular movement and the parallel movement too, it is possible to obtain the same advantage as that of the heretofore described embodiment in which the visual point 303 is moved in an order of the parallel movement and the circular movement.

In the heretofore described embodiment, an arrangement is such that, during the parallel movement of the visual point 303, the visual point 303 moves constantly at the moving speed determined in accordance with the length of the parallel movement path. As opposed to this, it is sufficient that the speed at which the parallel movement of the visual point 303 is carried out is equal to or lower than the predetermined speed. Also, it is also possible to arrange in such a way that the speed at which the parallel movement of the visual point 303 is carried out changes. For example, it is also acceptable that the speed at which the parallel movement of the visual point 303 is carried out is accelerated at an intermediate point (in a case in which the shortcut is carried out, the shortcut start point) from a stating time of the parallel movement, and decelerated at a finishing point from the intermediate time (in the case in which the shortcut is carried out, the shortcut finish point). In this case, the image specific to the shortcut displayed on the LCD while the shortcut is being carried out is sandwiched between points at which the parallel movement speed of the visual point 303 is high, and it does not happen that the player feels the anomaly in the shortcut. Also, the time for which the parallel movement of the visual point 303 is carried out is not necessarily constant, and may be changed when necessary. The speed of the circular movement of the visual point 303 is not necessarily made constant either in the event that it is made equal to or lower than the predetermined speed.

In the heretofore described embodiment, the visual point distance is constant with respect to all the player characters 200. As opposed to this, it is also acceptable that the visual point distance varies depending on each player character 200. It is also acceptable that the visual point distance is either fixed for each player character 200, or changed in accordance with predetermined conditions. For example, it is possible to arrange in such a way that the visual point distance of a large player character 200 is long, and the visual point distance of a small player character 200 is short.

In this case, in the event that a character, the visual point distance of which differs from that of the previous selected character, has been newly selected, it is also acceptable to, after first moving the position of the visual point 303 along the visual axis 304 in such a way as to be the visual point distance of the new selected character, move the position of the visual point 303 in parallel. It is also acceptable that the movement of the position of the visual point 303 along the visual axis 304 in such a way as to be the visual point distance of the new selected character is carried out before the circular movement is started after the parallel movement is finished, or after both the parallel movement and the circular movement finish.

In the heretofore described embodiment, an arrangement is such that the visual point 303 is moved in the direction in which the circular movement distance becomes short during the circular movement. As opposed to this, it is also acceptable that the direction of the circular movement is determined in accordance with the predetermined conditions. For example, it is also acceptable to arrange in such a way as to move in a direction of passing through a front direction of the new selected character. In this case, a face of the new selected character is displayed on the LCD 11 during the circular movement of the visual point 303.

In the heretofore described embodiment, an arrangement is such that the card disposition panel 13 includes the touch panel 16 and, in the event that there is a character card 20 in a position in which the touch panel 16 is touched, a player character 200 corresponding to the character card 20 becomes a new selected character. As opposed to this, for example, it is also acceptable to arrange in such a way as to determine whether or not even a slight change occurs in an image of a character card 20 read by the image sensor 108, and determine that the character card 20, in the read image of which the change has occurred, is pressed by the player.

In the heretofore described embodiment, a description has been given, as an example, of a case to which the invention is applied in the card game apparatus 1 using a character card 20. Naturally, it is possible to apply the invention to an overall game in which the player selects a player character 200 behaving in accordance with the operation of the player without using a character card 20. A quantity of player characters 200 not being limited to three, it is possible to adopt an optional quantity of two or more.

A computer apparatus, which is a platform carrying out a game in which the invention is embodied, not being limited to the heretofore described kind of card game apparatus 1, it is possible to apply it to a stationary home-use game machine, a portable game machine, a personal computer, or furthermore, a portable telephone including an application execution function, and the like. In a case of applying one of them as the platform, it is also possible to arrange in such a way as to carry out a competition between two persons via a network such as an internet, or with their apparatus connected to an infrared wireless communication or the like. Naturally, in a case of applying this kind of high versatility computer apparatus as the platform, it is also acceptable to adopt a mere operation of keys or a pointing device as a method which changes the selected character.

Herein, in a case in which the computer apparatus, which is the platform carrying out the game in which the invention is embodied, includes a second display device with a touch panel disposed on its top surface, apart from the display device corresponding to the LCD 11, it is also acceptable to arrange in such a way as to display a plurality of virtual cards on the second display device, and allow each virtual card to be selected by a touch operation of the touch panel. Herein, a character corresponding to a virtual card displayed in a position in which the touch operation has been carried out becomes the selected character. Also, it is also acceptable to arrange in such a way that a position and/or direction of each virtual card is changed by the touch operation of the touch panel. In this case, even without preparing a tangible card, it is possible to realize the same game element as that of the game according to the heretofore described embodiment.

In the heretofore described embodiment, the player selects a desired character from among a plurality of characters participating in the game by touching a card corresponding to the character. Naturally, in the event that another character, other than the character currently being selected, is displayed on the screen displayed on the display device, it is possible to designate the other character as a new selected character by a pointing or the like.

In the heretofore described embodiment, the program and data for executing the game to which the invention is applied are stored in advance in the memory 103 of the card game apparatus 1. Naturally, in a case in which the stationary or portable game machine, the personal computer or the like is applied as the platform which realizes the invention, it is also possible to apply a semiconductor memory card, an optical and/or magnetic disk (a flexible disk, a CD-ROM, a DVD-ROM or the like) to the program and data in accordance with an aspect of the computer apparatus which is the platform. In a case of using a computer apparatus including a fixed disk drive as the platform, it is also acceptable that the program and data are distributed stored in advance in the fixed disk drive.

Furthermore, in a case of applying a computer apparatus which can communicate with another computer apparatus via the network (including the card game apparatus 1 according to the heretofore described embodiment), it is also acceptable that the program and data are stored in a fixed disk drive included in a server existing on the network, and distributed via the network. In a case of the card game apparatus 1 according to the heretofore described embodiment, it is sufficient to apply a flash memory as the memory 103.

What is claimed is:

1. A game apparatus which displays, on a display device, a game screen obtained by perspectively transforming, onto a virtual screen, a virtual three-dimensional space in which a plurality of characters exist, from a viewpoint of a virtual camera, the apparatus comprising:
a character specifying system that specifies a character selected from among the plurality of characters in accordance with an operation of a player;
a virtual camera controller that controls a direction of a visual axis so that the direction of the visual axis becomes a direction having a predetermined relationship to a direction in which the character specified by the character specifying system faces, with a specific position which relates to the specified character as a reference point, and that controls a position of a visual point so that a distance between the specified character and the visual point becomes a predetermined distance;
a perspective transformer that perspectively transforms, onto the virtual screen, the virtual three-dimensional space from the viewpoint of the virtual camera, in which the position of the visual point and the direction of the visual axis have been fixed by the virtual camera controller, and generates two-dimensional images to be displayed on a screen of the display device; and
a display controller that displays the two-dimensional images generated by the perspective transformer on the display device,
wherein the virtual camera controller comprises:
a parallel movement system that, when a new character is specified by the character specifying system, moves the position of the visual point in a straight line, based on the position of the previously specified character and the position of the newly specified character, so that a specific position which relates to the newly specified character becomes the reference point, while maintaining the direction of the visual axis in a direction having the predetermined relationship to a direction of the previously specified character; and
a circular movement system that, after the position of the visual point is moved by the parallel movement system so that the specific position which relates to the newly specified character becomes the reference point, circularly moves the position of the visual point so that the direction of the visual axis becomes a back to front direction of the newly specified character, while maintaining the specific position which relates to the newly specified character as the reference point.

2. The game apparatus according to claim 1, wherein the parallel movement system, regardless of the distance between the previously specified character and the newly specified character, moves the position of the visual point, within a predetermined time, from a position in which the previously specified character is the reference point to the position in which the newly specified character is the reference point.

3. The game apparatus according to claim 1, wherein the parallel movement system moves the position of the visual point below a predetermined speed from the position in which the previously specified character is the reference point to the position in which the newly specified character is the reference point.

4. The game apparatus according to claim 3, wherein the parallel movement system further comprises a movement time determination system that, when the position of the visual point has been moved below the predetermined speed, determines whether the parallel movement system can move the position of the visual point within a predetermined time from the position in which the previously specified character is the reference point to the position in which the newly specified character is the reference character, and
wherein when the movement time determination system has determined that the parallel movement system cannot move the position of the visual point within the predetermined time, the parallel movement system moves the position of the visual point without limiting a speed of the movement to the predetermined speed or less in a partial intermediate section of the straight line parallel to the straight line connecting the position of the previously specified character and the position of the newly specified character.

5. The game apparatus according to claim 4, wherein the movement time determination system, depending on whether the distance between the previously specified character and the newly specified character is within a predetermined limit, determines whether the parallel movement system can move the position of the visual point below the predetermined speed and within the predetermined time.

6. The game apparatus according to claim 1, wherein the circular movement system circularly moves the position of the visual point below a predetermined speed until the direction of the visual axis becomes the back to front direction of the newly specified character.

7. The game apparatus according to claim 1,
wherein the circular movement system further comprises a rotation angle determination system that determines, in both left and right rotation directions, a size of a rotation angle of the position of the visual point from the direction of the visual axis being the back to front direction of the previously specified character, to the back to front direction of the newly specified character, and
wherein the circular movement system circularly moves the position of the visual point in a rotation direction in which the rotation angle determination system determines the rotation angle to be smaller.

8. The game apparatus according to claim 1, further comprising:
a card disposition system that dispose a plurality of cards corresponding to the plurality of characters on a plane corresponding to a virtual two-dimensional plane perpendicular to a height direction of the virtual three-dimensional space,
wherein the character specifying system specifies a character corresponding to a card selected by the operation of the player, from the plurality of cards disposed on the card disposition system, as a character selected by the player.

9. The game apparatus according to claim 8, further comprising:
a card detector that detects a position and direction of each card disposed on the card disposition system; and
a character controller that, in accordance with the position and direction of each card detected by the card detector, controls a position and direction of a character corresponding to each card.

10. The game apparatus according to claim 8,
wherein the card disposition system comprises a card mounting base, on which a tangible card is placed, information which identifies a type of the corresponding character being recorded on the tangible card, and
wherein the character specifying system comprises a card specifying system which specifies a card, from among the cards placed on the card mounting base, which is being touched by the player,
wherein the character specifying system specifies a character, corresponding to a card last specified by the card specifying system, as the character selected by the player.

11. The game apparatus according to claim 8,
wherein the card disposition system comprises a virtual card display system that displays a virtual card for each of the plurality of characters on a second display device which is provided separately from the display device and has a touch panel disposed on a front surface of the second display device, and
the character specifying system specifies a character corresponding to a card corresponding to a position of the touch panel which has last been touched, from the virtual cards displayed on the second display device, as the character selected by the player.

12. A game apparatus which displays, on a display device, a game screen obtained by perspectively transforming, onto a virtual screen, a virtual three-dimensional space in which a plurality of characters exist, from a viewpoint of a virtual camera, the apparatus comprising:
a character specifying system that specifies a character selected from the plurality of characters in accordance with an operation of a player;
a virtual camera controller that controls a direction of a visual axis so that the direction of the visual axis becomes a direction having a predetermined relationship to a direction in which the character specified by the character specifying system faces, with a specific position which relates to the specified character as a reference point, and that controls a position of a visual point so that a distance between the specified character and the visual point becomes a predetermined distance;
a perspective transformer that perspectively transforms the virtual three-dimensional space from the virtual camera, of which the position of the visual point and the direction of the visual axis have been fixed by the virtual camera controller, onto the virtual screen, and generates two-dimensional images to be displayed on the display device; and
a display controller that displays the two-dimensional images generated by the perspective transformer on the display device,
wherein the virtual camera controller comprises:
a circular movement system that, when a new character is specified by the character specifying system, circularly moves the position of the visual point so that the direction of the visual axis becomes a back to front direction of the newly specified character, while maintaining a specific position which relates to the previously specified character as the reference point; and
a parallel movement system that, after the position of the visual point is moved by the circular movement system so that the direction of the visual axis becomes the back to front direction of the newly specified character, moves the position of the visual point in a straight line based on the position of the previously specified character and the position of the newly specified character so that a specific position which relates to the newly specified character becomes the reference point, while maintaining the direction of the visual axis in the back to front direction of the newly specified character.

13. A virtual camera control method in a game in which a game screen obtained by perspectively transforming, onto a virtual screen, a virtual three-dimensional space, in which a plurality of characters exist, from a viewpoint of a virtual camera, is displayed on a display device, the method comprising:
specifying, by a processor, a character selected from the plurality of characters by an input by a player;
moving, by a processor, a position of a visual point in a straight line based on a position of a previously specified character and a position of a newly specified character so that a specific position which relates to the newly specified character becomes a reference point, when the newly specified character differing from the previously specified character is specified from the plurality of characters, while maintaining a direction of a visual axis in a direction having a predetermined relationship to a direction of the previously specified character;
circularly moving, by a processor, the position of the visual point so that the direction of the visual axis becomes a back to front direction of the newly specified character, after the position of the visual point moves so that the specific position which relates to the newly specified character becomes the reference point, while maintaining the specific position which relates to the newly specified character as the reference point;

perspectively transforming, by a processor, the virtual three-dimensional space from the viewpoint of the virtual camera onto the virtual screen at predetermined time intervals, and generating two-dimensional images to be displayed on the display device; and sequentially displaying, by a processor, the two-dimensional images generated by the perspective transformation on a screen of the display device.

14. A virtual camera control method in a game in which a game screen obtained by perspectively transforming, onto a virtual screen, a virtual three-dimensional space, in which a plurality of characters exist, from a virtual camera is displayed on a display device, the method comprising:

specifying, by a processor, a character selected from among the plurality of characters by an input by a player;

circularly moving, by a processor, a position of a visual point so that a direction of a visual axis becomes a back to front direction of the newly specified character, when the newly specified character differing from the previously specified character is specified from the plurality of characters, while maintaining a specific position which relates to the previously specified character as a reference point;

moving, by a processor, the position of the visual point in a straight line based on the position of the previously specified character and the position of the newly specified character so that a specific position which relates to the newly specified character becomes the reference point, after the position of the visual point moves circularly so that the direction of the visual axis becomes the back to front direction of the newly specified character, while maintaining the direction of the visual axis as the back to front direction of the newly specified character;

perspectively transforming, by a processor, the virtual three-dimensional space from the virtual camera onto the virtual screen at predetermined time intervals, and generating two-dimensional images to be displayed on the display device; and sequentially displaying, by a processor, the two-dimensional images generated by the perspective transformation on the screen of the display device.

15. A non-transitory computer readable medium on which a game program executed by a computer apparatus is recorded, which, when executing a game by operating a character in accordance with the game program, perspectively transforms onto a virtual screen, from the viewpoint of a virtual camera, a virtual three-dimensional space in which a character acting in accordance with an instruction from a player exists, and displays the transformed virtual three-dimensional space on a display device, the game program comprising:

a character specifying system that specifies a character selected from the plurality of characters in accordance with an operation of a player;

a virtual camera controller that controls a direction of a visual axis so that the direction of the visual axis becomes a direction having a predetermined relationship to a direction in which the character specified by the character specifying system faces with a specific position which relates to the specified character as a reference point and controls a position of a visual point so that a distance between the specified character and the visual point becomes a predetermined distance;

a perspective transformer that perspectively transforms the virtual three-dimensional space from the virtual camera, in which the position of the visual point and the direction of the visual axis have been fixed by the virtual camera controller, onto the virtual screen, and generates two-dimensional images to be displayed on a screen of the display device; and a display controller that displays the two-dimensional images generated by the perspective transformer on the display device, wherein the virtual camera controller comprises:

a parallel movement system that, when a new character is specified by the character specifying system, moves the position of the visual point along a straight line based on the position of the previously specified character and the newly specified character so that a specific position which relates to the position of the newly specified character becomes the reference point, while maintaining the direction of the visual axis in a direction having the predetermined relationship to a direction of the previously specified character; and a circular movement system that, after the position of the visual point is moved by the parallel movement system so that the specific position which relates to the newly specified character becomes the reference point, circularly moves the position of the visual point so that the direction of the visual axis becomes a back to front direction of the newly specified character, while maintaining the specific position which relates to the newly specified character as the reference point.

16. A non-transitory computer readable medium on which a game program executed by a computer apparatus is recorded, which, when executing a game by operating a character in accordance with the game program, perspectively transforms onto a virtual screen, from the viewpoint of a virtual camera, a virtual three-dimensional space in which a character acting in accordance with an instruction from a player exists, and displays the transformed virtual three-dimensional space on a display device, the game program comprising:

a character specifying system that specifies a character selected from among the plurality of characters in accordance with an operation of a player;

a virtual camera controller that controls a direction of a visual axis so that the direction of the visual axis becomes a direction having a predetermined relationship to a direction in which the character specified by the character specifying system faces with a specific position which relates to the specified character as a reference point and controls a position of a visual point so that a distance between the specified character and the visual point becomes a predetermined distance;

a perspective transformer that perspectively transforms the virtual three-dimensional space from the virtual camera, in which the position of the visual point and the direction of the visual axis have been fixed by the virtual camera controller, onto the virtual screen, and generates two-dimensional images to be displayed on a screen of the display device; and a display controller that displays the two-dimensional images generated by the perspective transformer on the display device, wherein the virtual camera controller comprises:

a circular movement system that, when a new character is specified by the character specifying system, circularly moves the position of the visual point so that the direction of the visual axis becomes a back to front direction of the newly specified character, while maintaining a specific position which relates to the previously specified character as the reference point; and a parallel movement system that, after the position of the visual point is moved by the circular movement system so that the direction of the visual axis becomes the back to front direction of the newly specified character, moves the position of the visual point along a straight line based on the position of the previously specified character and the position of the newly specified character so that a specific position which relates to the newly specified character becomes the reference point, while maintaining the direction of the visual axis in the back to front direction of the newly specified character.

17. The game apparatus according to claim 1, wherein the circular movement system circularly moves the position of the visual point along a visual point circle having the visual point distance as a radius from the newly specified character, the visual point distance being a predetermined distance between the position of the visual point and the reference point.

18. The game apparatus according to claim 12, wherein the circular movement system circularly moves the position of the visual point along a visual point circle having the visual point distance as a radius from the previously specified character, the visual point distance being a predetermined distance between the position of the visual point and the reference point.

19. The virtual camera control method according to claim 13, wherein the circularly moving moves the position of the visual point along a visual point circle having the visual point distance as a radius from the newly specified character, the visual point distance being a predetermined distance between the position of the visual point and the reference point.

20. The virtual camera control method according to claim 14, wherein the circularly moving moves the position of the visual point along a visual point circle having the visual point distance as a radius from the previously specified character, the visual point distance being a predetermined distance between the position of the visual point and the reference point.

* * * * *